(12) United States Patent
Yoshida et al.

(10) Patent No.: US 6,460,330 B1
(45) Date of Patent: Oct. 8, 2002

(54) ENGINE INTAKE A/F RATIO CONTROL SYSTEM IN OUTBOARD ENGINE SYSTEM

(75) Inventors: Hiroyuki Yoshida; Toyokazu Kawasaki; Yoshihiko Fukuda, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/762,206

(22) PCT Filed: Aug. 3, 1999

(86) PCT No.: PCT/JP99/04182

§ 371 (c)(1),
(2), (4) Date: Feb. 5, 2001

(87) PCT Pub. No.: WO00/08331

PCT Pub. Date: Feb. 17, 2000

(30) Foreign Application Priority Data

Aug. 5, 1998 (JP) .......................................... 10-222060

(51) Int. Cl.⁷ ................................................ F01N 3/10
(52) U.S. Cl. ...................... 60/300; 60/289; 60/292; 60/302; 123/59.5; 123/580; 123/585; 123/699; 440/76; 440/900
(58) Field of Search .......................... 60/300, 299, 302, 60/304, 289, 292, 293; 123/579, 585, 59.5, 580, 699; 440/76, 77, 84, 113, 900

(56) References Cited

U.S. PATENT DOCUMENTS

| 4,002,025 A | * | 1/1977 | Yamaguchi et al. | .......... 60/274 |
| 4,104,881 A | * | 8/1978 | Kogure et al. | ................. 60/299 |
| 4,192,140 A | * | 3/1980 | Yamashita et al. | ............ 60/277 |
| 4,342,194 A | * | 8/1982 | Paddock et al. | ............... 60/290 |
| 4,677,959 A | * | 7/1987 | Suzuki et al. | ................ 123/587 |
| 5,150,673 A | * | 9/1992 | Hoshiba et al. | ........ 123/179.15 |
| 5,346,417 A | * | 9/1994 | Isogawa | ....................... 440/89 |
| 5,522,746 A | * | 6/1996 | Shishido et al. | ............... 440/76 |
| 5,553,586 A | * | 9/1996 | Koishikawa et al. | ..... 123/195 P |

FOREIGN PATENT DOCUMENTS

| JP | 51-121626 | 10/1976 |
| JP | 53-100329 | 9/1978 |
| JP | 56-2438 | 1/1981 |
| JP | 56-2548 | 1/1981 |
| JP | 57-124050 | 8/1982 |
| JP | 58-92435 | 6/1983 |
| JP | 59-74360 | 4/1984 |
| JP | 59-18092 | 5/1984 |
| JP | 1-219345 | 9/1989 |
| JP | 4-50441 | 2/1992 |
| JP | 8-28357 | 1/1996 |
| JP | 9-156594 | 6/1997 |
| JP | 11-257157 | 9/1999 |

* cited by examiner

Primary Examiner—Thomas Denion
Assistant Examiner—Binh Tran
(74) Attorney, Agent, or Firm—Arent Fox Kintner Plotkin & Kahn

(57) ABSTRACT

In an engine intake A/F ratio control system in an outboard engine system, a secondary air passage (P) for supplying secondary air for regulating the A/F ratio of an air-fuel mixture is connected to a carburetor (33) in an intake system of an engine (E), and a duty control valve (68) is connected to the secondary air passage (P). A duty control unit (92) is connected to the duty control valve (68) for controlling the duty ratio of a pulse applied to a coil (76) of the duty control valve (68), and an LAF sensor (94) is mounted to an exhaust system for detecting an A/F ratio of an exhaust gas to input a detection signal proportional to the A/F ratio of the exhaust gas to the duty control unit (92). Thus, in any of a case when the tolerance of the purifying rate of the catalytic converter is set relatively widely with an engine output taken into consideration to a certain extent, and a case when the set range is shifted to a rich side of the A/R ratio with the engine output taken into serious consideration, the A/F ratio of the exhaust gas can be controlled properly to a desired target value.

5 Claims, 17 Drawing Sheets

ENGINE INTAKE A/F RATIO CONTROL SYSTEM IN OUTBOARD ENGINE SYSTEM

FIELD OF THE INVENTION

The present invention relates to an engine intake A/F (air-fuel) ratio control system in an outboard engine system which includes an engine disposed in an engine room defined by an engine support connected to an upper portion of an extension case and by an engine cover covering the engine support, and a catalytic converter incorporated in an exhaust system for the engine, so that an exhaust gas exiting from the exhaust system is discharged under the external water surface via an inside of the extension case, the intake A/F ratio control system being operable to control the air-fuel ratio of an air-fuel mixture to be supplied from a carburetor to the engine.

BACKGROUND ART

There is a conventionally known outboard engine system including a catalytic converter incorporated in an exhaust system for an engine, for purifying an exhaust gas (for example, see Japanese Utility Model Publication No.59-18092).

It should be noted here that the catalytic converter exhibits the highest purifying function in an extremely narrow range A of A/F ratio of an exhaust gas around a theoretic A/F ratio (14.6), as shown in FIG. 17. Therefore, when a catalytic converter is used for purifying an exhaust gas from an engine, it is a conventional common practice to detect an A/F ratio of an exhaust gas by an $O_2$ sensor varying an output largely at about a theoretic A/F ratio, and to control the A/F ratio of an air-fuel mixture drawn into the engine, so that the $O_2$ sensor produces an output corresponding to the theoretic A/F ratio, whereby the exhaust gas is always purified with a good efficiency by the catalytic converter.

The $O_2$ sensor varies the output largely relative to a variation in A/F ratio in the range A, but a variation in output relative to a variation in A/F ratio is little produced in a range other than the range A. Therefore, the use of the $O_2$ sensor is advantageous for controlling the A/F ratio of the exhaust gas to the theoretic A/F ratio with a good efficiency, but when the tolerance of the purifying rate of the catalytic converter is set relatively widely with the engine output taken into consideration to a certain extent, it is extremely difficult to carry out the control of the A/F ratio with the $O_2$ sensor.

DISCLOSURE OF THE INVENTION

The present invention has been accomplished with such circumstances in view, and it is an object of the present invention to provide an engine intake A/F ratio control system in an outboard engine system of the above-described type, wherein, in any of a case when the tolerance of the purifying rate of a catalytic converter is set relatively widely with an engine output taken into consideration to a certain extent, irrespective of a narrow range including a theoretic /F ratio, and a case when the set range is shifted to a rich side of the A/F ratio with the engine output taken into serious consideration, the A/F ratio of an exhaust gas can be controlled properly to a desired target value.

To achieve the above object, according to a first aspect and feature of the present invention, there is provided an engine intake A/F ratio control system in an outboard engine system which includes an engine disposed in an engine room defined by an engine support connected to an upper portion of an extension case and by an engine cover covering the engine support, and a catalytic converter incorporated in an exhaust system for the engine, wherein an exhaust gas exiting from the exhaust system is discharged under external water surface via an inside of the extension case, characterized in that the engine intake A/F ratio control system comprises a secondary air passage connected to a carburetor provided in an intake system for the engine for supplying secondary air for regulating the A/F ratio of an air-fuel mixture produced in the carburetor; a duty control unit connected to a duty control valve connected to the secondary air passage for controlling the duty ratio of a pulse applied to a coil of the duty control valve; and an LAF sensor (LINEAR AIR-FUEL RATIO SENSOR) mounted to the exhaust system for detecting an A/F ratio of an exhaust gas flowing through the exhaust system, thereby outputting a detection signal proportional to the A/F ratio to the duty control unit.

With the first feature, the A/F ratio of the air-fuel mixture in the carburetor to be supplied to the engine can be controlled in a wide operating range of the engine extending from a low load to a high load by regulating the duty ratio of the pulse applied to the duty control valve by the duty control unit, based on the detection signal of the LAF sensor proportional to the A/F ratio of the exhaust gas, thereby improving the properties of the exhaust gas and enhancing the engine output.

Namely, the output from the LAF sensor is proportional to the A/F ratio of the exhaust gas. Therefore, the A/F ratio of the exhaust gas can be controlled to a narrow range including a theoretic A/F ratio, and also in any of a case when the tolerance of the purifying rate of the catalytic converter is set relatively widely with an engine output taken into consideration to a certain extent, and a case when the set range is shifted to a rich side with the engine output taken into serious consideration, the A/F ratio of the exhaust gas can be controlled properly to a desired target value. Therefore, it is possible to carry out the control operation depending on the operating conditions of the engine such as a mode with the purification taken into serious consideration, a mode with the purification and output taken in consideration and a mode with the output taken into serious consideration. An increase in engine output enables the size of the engine to be reduced and hence, it is easy to place the engine in a narrow engine room in the outboard engine system.

According to a second aspect and feature of the present invention, in addition to the above first feature, a mounting wall is formed in a side wall of an exhaust line integrally connected to the engine to form a portion of the exhaust system, the side wall facing sideways of the outboard engine system, the mounting wall being inclined inwards of the exhaust line toward a lower portion thereof, and the LAF sensor is mounted substantially vertically to the mounting wall.

With the second feature, the mounting wall of the exhaust line is inclined inwards of the exhaust line toward its lower portion. Therefore, the length of protrusion of the LAF sensor mounted substantially vertically to the mounting wall in an outward direction of the outboard engine system can be suppressed to a value as small as possible, whereby the contact of the sensor with another portion or component can be avoided to the utmost, and the detection of the A/F ratio of the exhaust gas can be carried out reliably. Moreover, the LAF sensor is directed outwards of the outboard engine system and hence, it is possible to easily attach and detach the LAF sensor to and from the mounting wall.

According to a third aspect and feature of the present invention, in addition to the second feature, the exhaust line and the mounting wall are formed on the engine support covered with a detachable undercover, and the LAF sensor mounted to the mounting wall is covered with the undercover.

With the third feature, the undercover serves as a protective wall for the LAF sensor, thereby enabling the contact of another portion or component with the sensor to be prevented. In addition, the attachment and detachment of the LAF sensor can be carried out easily in a state in which the undercover has been removed.

According to a fourth aspect and feature of the present invention, there is provided an engine intake A/F ratio control system in an outboard engine system comprising a multi-cylinder engine including a plurality of carburetors for individually supplying an air-fuel mixture into a plurality of cylinders, characterized in that the engine intake A/F ratio control system comprises a single common duty control valve connected to air bleeding chambers in the plurality of carburetors through a dispensing tube, and a duty control unit connected to the duty control valve for controlling the duty ratio of a pulse applied to a coil of the duty control valve.

With the fourth feature, the amount of air mixed into a fuel passed through each of main nozzles of the plurality of carburetors can be controlled by duty-controlling of the pulse applied to the single duty control valve, thereby equally controlling the A/F ratios of the air-fuel mixtures supplied to the plurality of cylinders in the engine, while promoting the atomization of the fuel in the air-fuel mixture.

According to a fifth aspect and feature of the present invention, in addition to the fourth feature, the number of the carburetors is three; three outlet tubes of the dispensing tube made of a hard material are connected to the air-bleeding chambers in the three carburetors; and an air outlet of the duty control valve is connected to a single inlet tube of the dispensing tube, the single inlet tube and the three outlet tubes being disposed so that all of angles formed by the outlet tubes with respect to the inlet tube at connections of these tubes are substantially equal to one another.

With the fifth feature, the resistances in flow paths extending from the single duty control valve to the plurality of carburetors can be equalized, thereby reliably and equally controlling the intake A/F ratios for the plurality of cylinders of the engine.

According to a sixth aspect and feature of the present invention, in addition to the fourth feature, further including an LAF sensor provided in an exhaust passage in the engine for detecting an A/F ratio of an exhaust gas flowing through the exhaust passage to output a detection signal proportional to the A/F ratio, an output portion of the LAF sensor being connected to an input portion of the duty control unit.

With the sixth feature, the intake A/F ratio for each of the cylinders can be controlled in accordance with the A/F ratio of the exhaust gas in a wide operating range of the engine extending from a low load to a high load, thereby improving the properties of the exhaust gas from the engine at all times.

According to a seventh aspect and feature of the present invention, in addition to the fourth feature, the duty control valve includes a valve member accommodated therein and operated to open the duty control valve upon excitation of the coil, the duty control valve being provided with a valve case having an air outlet opened and closed by the valve member, and an outer case surrounding the valve case to define a cylindrical air chamber around the valve case, the valve case being provided with a through-bore which permits an upper portion of the air chamber to communicate with the inside of the valve case, and the outer case being provided with an air inlet which opens a lower portion of the air outlet to the atmosphere.

With the seventh feature, water is sprinkled over the duty control valve from the outside, and even if such water enters the air inlet of the valve, the vigor of the water can be attenuated in the air chamber, whereby the entering of the water into the overlying through-bore and thus into the valve case can be prevented.

According to an eighth aspect and feature of the present invention, in addition to the sixth feature, a catalytic converter is incorporated in the exhaust passage.

With the eighth feature, the properties of the exhaust gas can be improved by the purifying effect of the catalytic converter.

According to a ninth aspect and feature of the present invention, in addition to the sixth feature, a first catalytic converter is mounted in an exhaust collecting chamber communicating with a plurality of exhaust ports in the engine; a second catalytic converter is incorporated in an exhaust passage downstream of the exhaust collecting chamber; and the LAF sensor is provided in an exhaust passage between both of the catalytic converters.

With the ninth feature, the properties of the exhaust gas can be improved at all times in a wide operating range of the engine extending from a low temperature to a high temperature by the purifying effects of the first and second catalytic converters. Moreover, the LAF sensor can be placed easily in the exhaust passage between both of the catalytic converters.

According to a tenth aspect and feature of the present invention, in addition to the fourth feature, an accelerating pump is connected to a flow path connecting each of the air-bleeding chambers in the plurality of carburetors with the single common duty control valve, the accelerating pump pressurizing the flow path in operative association with a rapid opening of a throttle valve in each of the carburetors.

With the tenth feature, the flow path connecting each of the air-bleeding chambers in the plurality of carburetors with the single common duty control valve is utilized for both of control of the amount of air bled and control of the acceleration, and both of the controls can be satisfied by a simple structure.

According to an eleventh aspect and feature of the present invention, there is provided an engine intake A/F ratio control system in an outboard engine system, comprising a secondary air passage connected to a carburetor mounted in an intake system in an engine for supplying secondary air for regulating the A/F ratio of an air-fuel mixture produced in the carburetor, and a duty control valve connected to the secondary air passage to control the amount of secondary air supplied to the carburetor by controlling the duty ratio of a pulse applied to a coil of the duty control valve, characterized in that a surge tank and an orifice are incorporated in series in the secondary air passage.

With the eleventh feature, even if a pressure pulsation is produced in the secondary air passage with the turning-on and off of the pulse applied to the coil of the duty control valve, the pressure pulsation can be attenuated effectively by a damping effect of the surge tank and a constricting resistance of the orifice.

According to a twelfth aspect and feature of the present invention, in addition to the eleventh feature, the secondary air passage is connected to an air-bleeding chamber defined around a main nozzle of the carburetor.

With the twelfth feature, the secondary air supplied from the secondary air passage to the air-bleeding chamber is mixed with a fuel passed through the main nozzle and hence, the regulation of the A/F ratio of an air-fuel mixture and the promotion of the atomization of the fuel can be provided simultaneously.

According to a thirteenth aspect and feature of the present invention, there is provided an engine intake A/F ratio control system in an outboard engine system comprising a multi-cylinder engine disposed in an engine room defined by an engine support connected to an upper portion of an extension case and by an engine cover covering the engine support, with a crankshaft of the engine being turned vertically and a cylinder head of the engine being turned rearwards of a hull, and a plurality of carburetors mounted in a vertical arrangement in the engine for individually supplying an air-fuel mixture to a plurality of cylinders, characterized in that the engine intake A/F ratio control system comprises a single common duty control valve connected to air-bleeding chambers in the plurality of carburetors through a dispensing tube, a duty control unit connected to the duty control valve for controlling the duty ratio of a pulse applied to a coil of the duty control valve, and a surge tank incorporated in a flow path connecting the dispensing tube and the duty control valve to each other.

With the thirteenth feature, the amount of air bled, which is to be mixed with a fuel passed through each of the main nozzles of the plurality of carburetors, can be controlled by duty-controlling the pulse applied to the single duty control valve, thereby equally controlling the intake A/F ratios for the plurality of cylinders in the engine, while improving the atomization of the fuel injected from the main nozzle. Therefore, the only one duty control valve suffices for use, thereby providing a simplification in arrangement, and enabling the engine to be placed easily in the narrow engine room in the outboard engine system, while avoiding the interference with another part or component. Moreover, if a pressure pulsation is produced in a flow path extending from the duty control valve to each of the air-bleeding chambers with the turning-on and off of the pulse applied to the duty control valve, the pressure pulsation can be attenuated effectively by the damping effect of the surge tank.

According to a fourteen aspect and feature of the present invention, in addition to the thirteenth feature, an LAF sensor is provided in an exhaust passage in the engine for detecting an A/F ratio of an exhaust gas flowing through the exhaust passage to output a detection signal proportional to the A/F ratio of the exhaust gas, an output portion of the LAF sensor being connected to an input portion of the duty control unit.

With the fourteenth feature, the intake A/F ratio for each of the cylinders can be controlled in accordance with the A/F ratio of the exhaust gas in a wide operating range of the engine extending from a low load to a high load. Thus, it is possible to improve the properties of the exhaust gas from the engine at all times.

According to a fifteenth aspect and feature of the present invention, in addition to the first feature, the plurality of carburetors are disposed on one of left and right sides of a cylinder block; the surge tank is disposed in one of a first space defined at the rear of the carburetors by a side of the cylinder head and an inner surface of the engine cover and a second space defined by a rear surface of the cylinder head and the inner surface of the engine cover, and a fuel pump is disposed in the other of the first and second spaces and is driven by a valve-operating cam shaft carried in the cylinder head to supply a fuel to each of the carburetors.

With the fifteenth feature, it is possible to carry out the disposition of the fuel pump and the surge tank by effectively utilizing the first space at the rear of the carburetors and the second space at the rear of the cylinder head to contribute to the compactness of the engine room.

According to a sixteenth aspect and feature of the present invention, in addition to the first, eighth or ninth feature, the exhaust system is provided with an exhaust box, an inlet case which is connected to the exhaust system at a location upstream of the exhaust box and opens at a lower end thereof into the exhaust box, and an outlet case which opens at an upper end thereof into the exhaust box above a lower end of the inlet case and also opens at a lower end thereof below the exhaust box; the catalytic converter is mounted in the inlet case; and a drainage pipe bent into an inverted U-shape is mounted to the exhaust box, with one of lower ends of the drainage pipe opening in the proximity to an internal bottom surface of the exhaust box, and the other lower end opening below the exhaust box.

With the sixteenth feature, during operation of the engine, an exhaust pressure of the engine is applied to the inside of the exhaust box to produce a difference in pressure between the inside of the exhaust box and the inside of the extension case. Therefore, when water has been accumulated in the bottom of the exhaust box by any reason, such water is discharged through the drainage pipe into the extension case under the action of the difference in pressure. The bent portion of the drainage pipe is located above both of its lower ends and hence, unless the water level within the extension case is raised, so that the bent portion of the drainage pipe is submerged under the water, the entrance of the water from the drainage pipe into the exhaust box 115 can be prevented. Therefore, it is possible to prevent the entrance of the water into the catalytic converter within the inlet case, thereby prolonging the life of the catalytic converter.

According to a seventeenth aspect and feature of the present invention, in addition to the sixteenth feature, a central bent portion of the drainage pipe is disposed at substantially the same level as of an upper end of the outlet case.

With the seventeenth feature, water-entrance preventing limit water levels in the outlet case and the drainage pipe can be set substantially equivalently, thereby enhancing the function of preventing the entrance of water into the exhaust box.

The above and other objects, features and advantages of the invention will become apparent from the following description of the preferred embodiment taken in conjunction with the accompanying drawings.

BEST MODE FOR CARRYING OUT THE INVENTION

Figure 1:
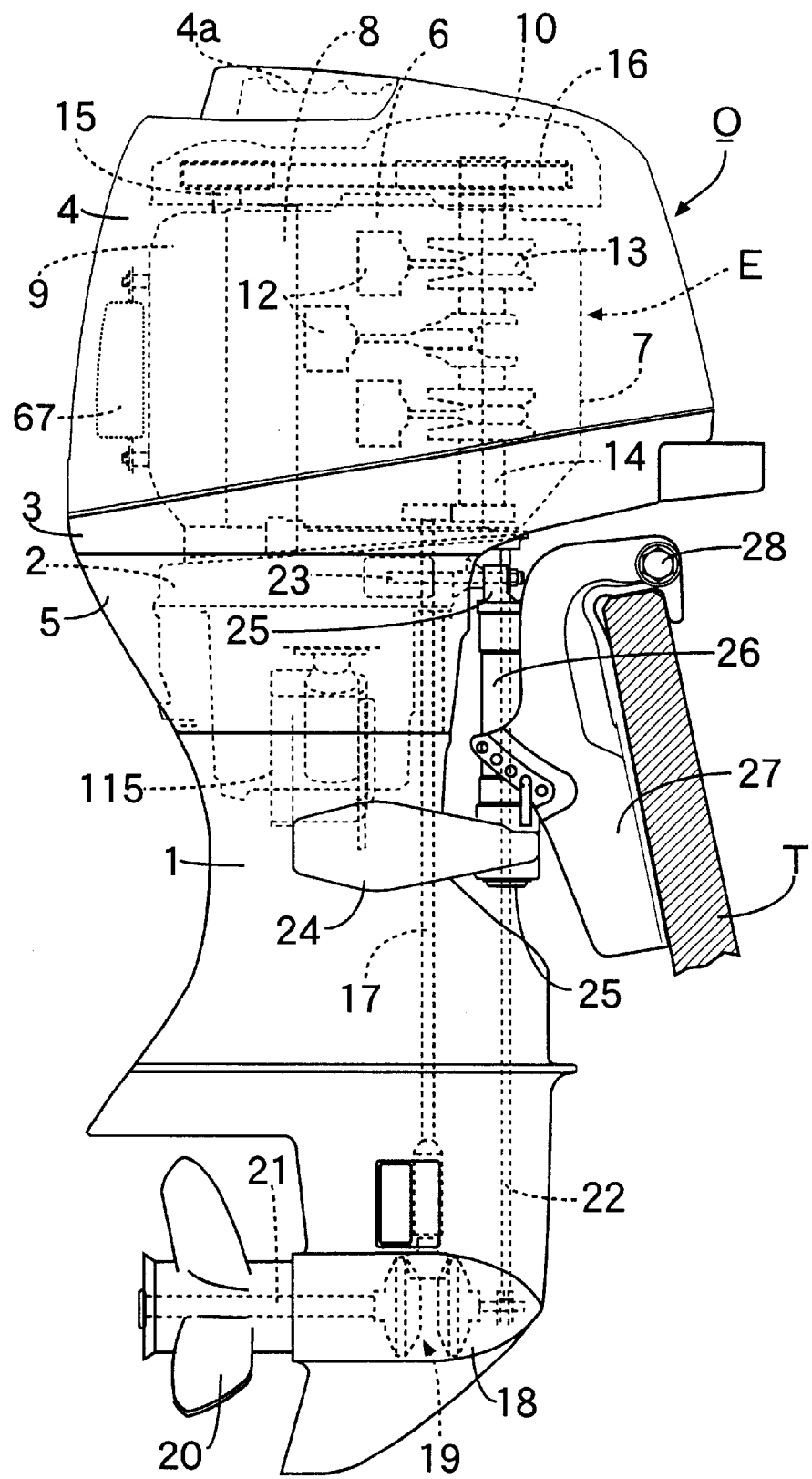
FIG. 1 is a side view of the entire arrangement of an outboard engine system.
Figure 2:
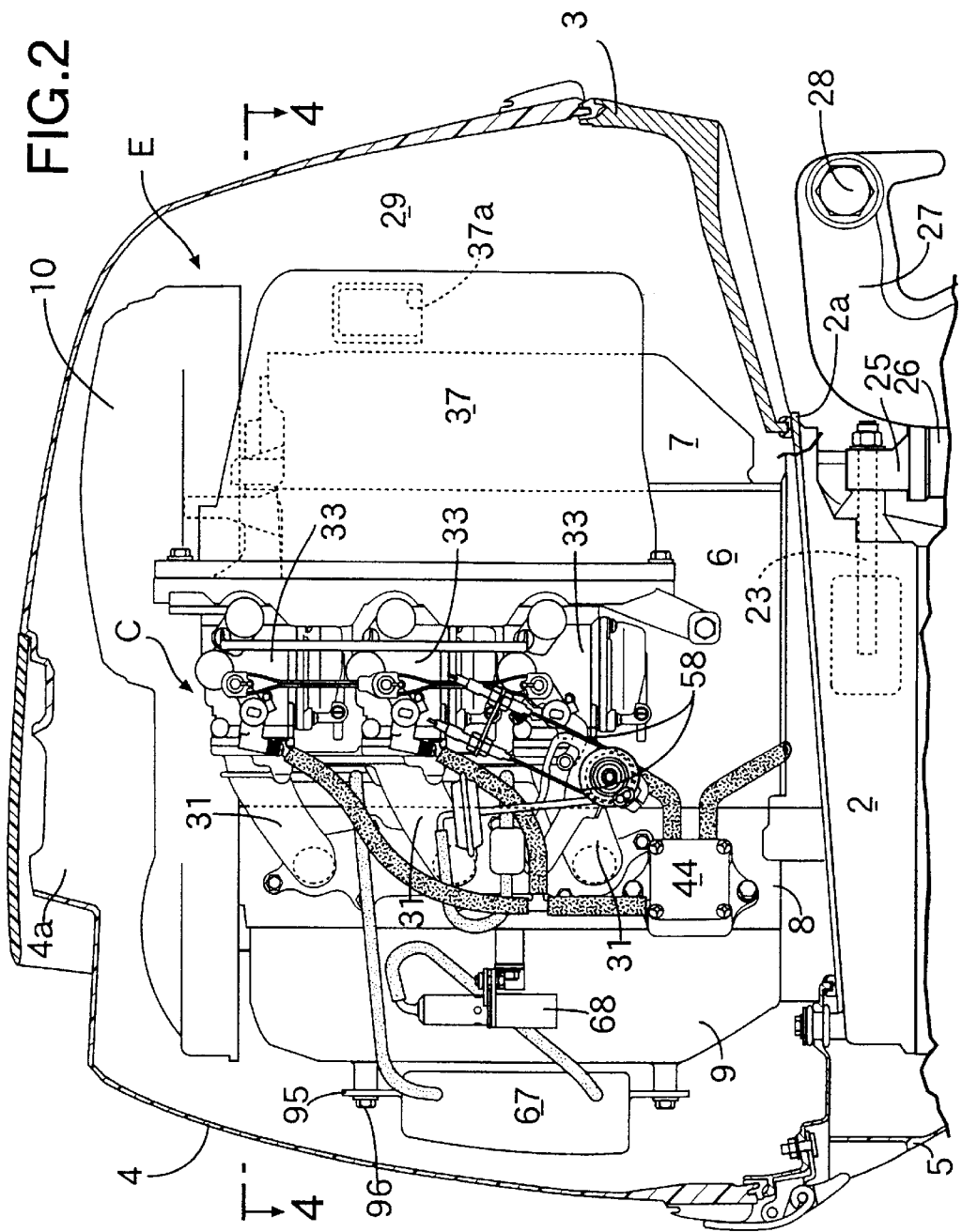
FIG. 2 is an enlarged side view of an engine section shown in FIG. 1.

Referring to FIGS. 1 and 2, an outboard engine system O includes an extension case 1, and a mount case 2 (an engine support) coupled to an upper portion of the extension case 1. A water-cooled in-line type 3-cylinder and 4-cycle engine E is mounted and supported on an upper surface of the amount case 2 with its crankshaft 14 disposed vertically. The mount case 2 includes a flange portion 2a around its outer periphery, and an extension case 3, which opens upwards, is bolted to an upper surface of the flange portion 2a. An engine cover 4 is detachably mounted at an upper portion of the extension case 3. An engine room 29 accommodating the engine E is defined by the engine cover 4, the mount case 2 and the extension case 3.

Figure 5:
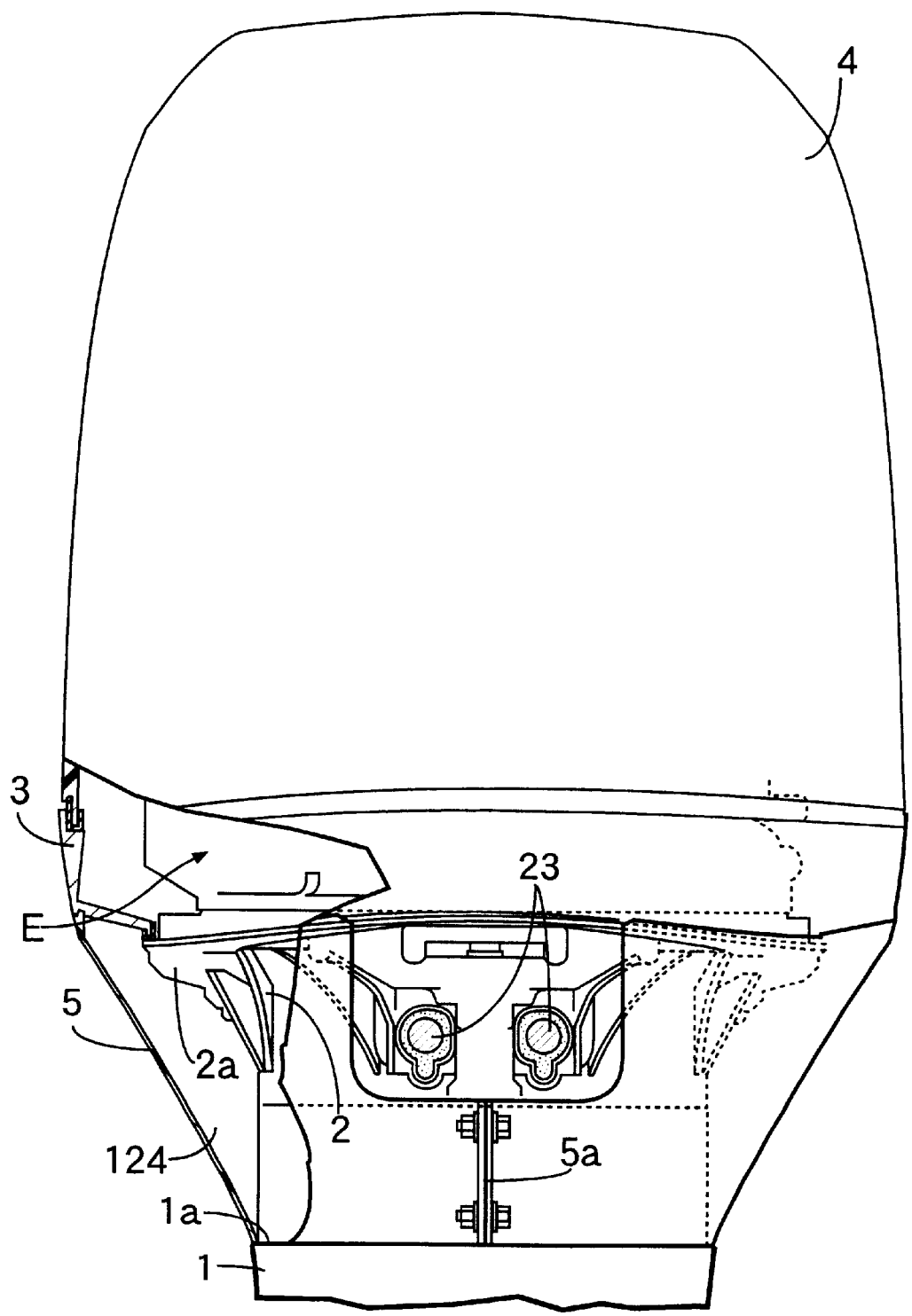
FIG. 5 is a partially broken-away front view of the outboard engine system.

Referring to FIGS. 2 and 5, an annular undercover 5 is mounted between the extension case 3 and the extension case 1 to cover an outer peripheral surface of the mount case 2. The undercover 5 is made of a synthetic resin having an elasticity, and has a single abutment 5a formed at a front portion adjacent a hull. In mounting the undercover 5, first, an abutment 5a of the extension case 3 is opened largely, and the undercover 5 is disposed to surround the mount case 2. At the same time, an end edge of a lower portion of the undercover 5 is engaged with an annular step 1a formed around an outer periphery of an upper portion of the extension case 1. On the one hand, an upper end of the undercover 5 is coupled to the extension case 3 by a tapping screw (not shown), and ends of the abutment are fastened to each other by bolts 32, so that the abutment 5a of the undercover 5 is closed. In this manner, the undercover 5 forms a continuous surface which permits the outer peripheral surfaces of the extension case 3 and the extension case 1 to be continuous to each other, while covering the mount case 2.

Referring to FIGS. 1 to 4, 6 and 12, the engine E includes a cylinder block 6, a crankcase 7, a cylinder head 8, a head cover 9 and a belt cover 10. The cylinder block 6 and the crankcase 7 are mounted on the upper surface of the mount case 2 with the cylinder head 8 turned rearwards of the hull. A piston 12 is slidably received in each of three cylinders 11 defined in the cylinder block 6, and the crankshaft 14 connected to the pistons 12 through a connecting rod 14 is carried between the cylinder block 6 and the crankcase 7 to face vertically. A valve-operating camshaft 15 is carried in the cylinder head 8 in parallel to the crankshaft 14 and driven by the crankshaft 14 through a timing belt device 16 covered with the head cover 10.

A driving shaft 17 is connected to a lower end of the crankshaft 14 through a transmitting gear to extend downwards within the extension case 1, and is connected at its lower end to a propeller shaft 21 having a propeller 20 at its rear end through a bevel gear mechanism 19 provided within the gear case 18. A shift rod 22 is connected at its lower end to a front portion of the bevel gear mechanism 19 in order to switch over the direction of rotation of the propeller shaft 21 to a normal direction or a reverse direction.

A swivel shaft 25 is fixed between a pair of left and right upper arms 23 supporting the mount case 2 and a pair of left and right lower arms 24 supporting the extension case 1. A swivel case 26 rotatably supporting the swivel shaft 25 is vertically swingably supported through a tilting shaft 28 on a stern bracket 27 mounted on a transom T of the hull.

Figure 3:
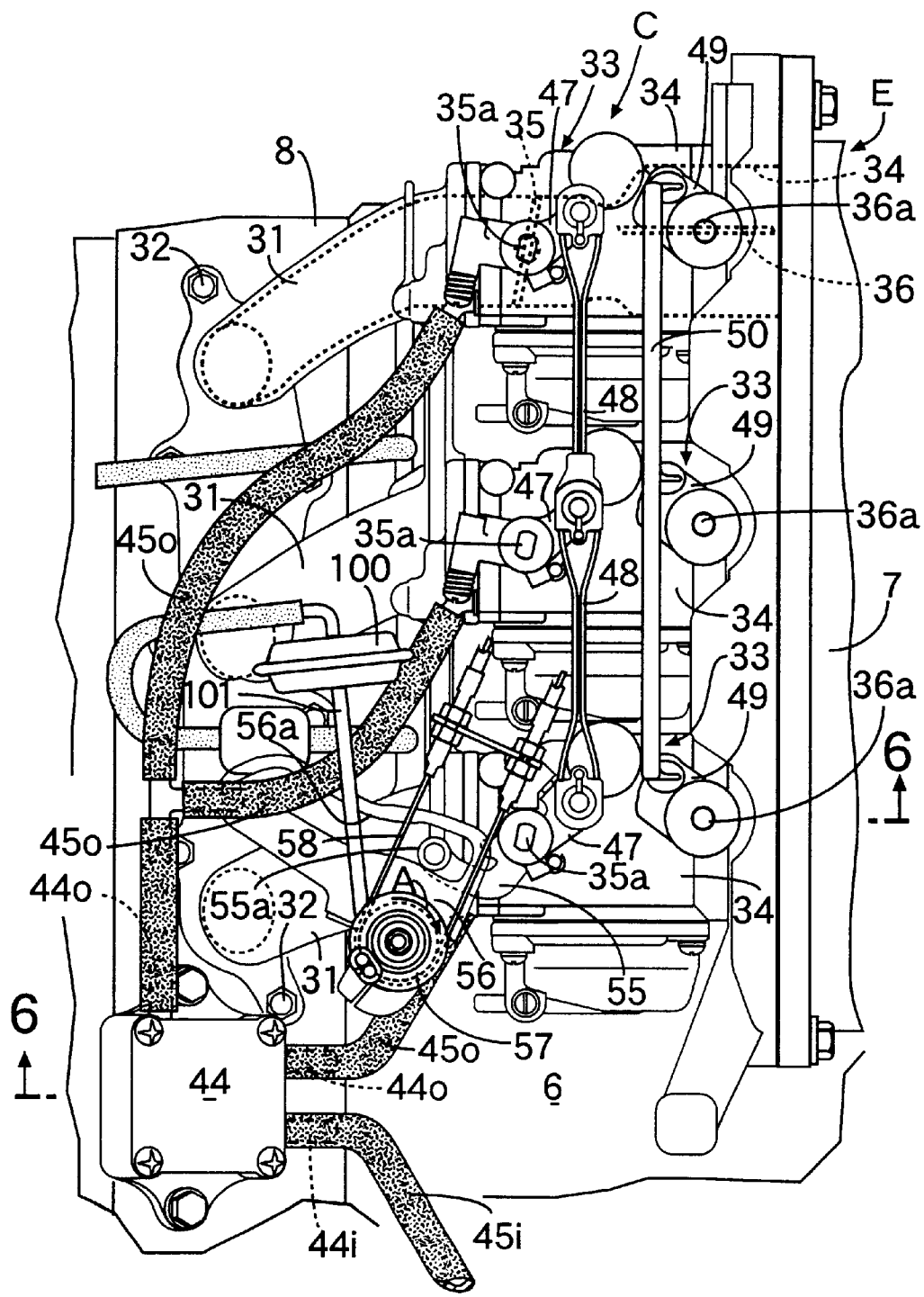
FIG. 3 is an enlarged side view of an essential portion shown in FIG. 2.
Figure 4:
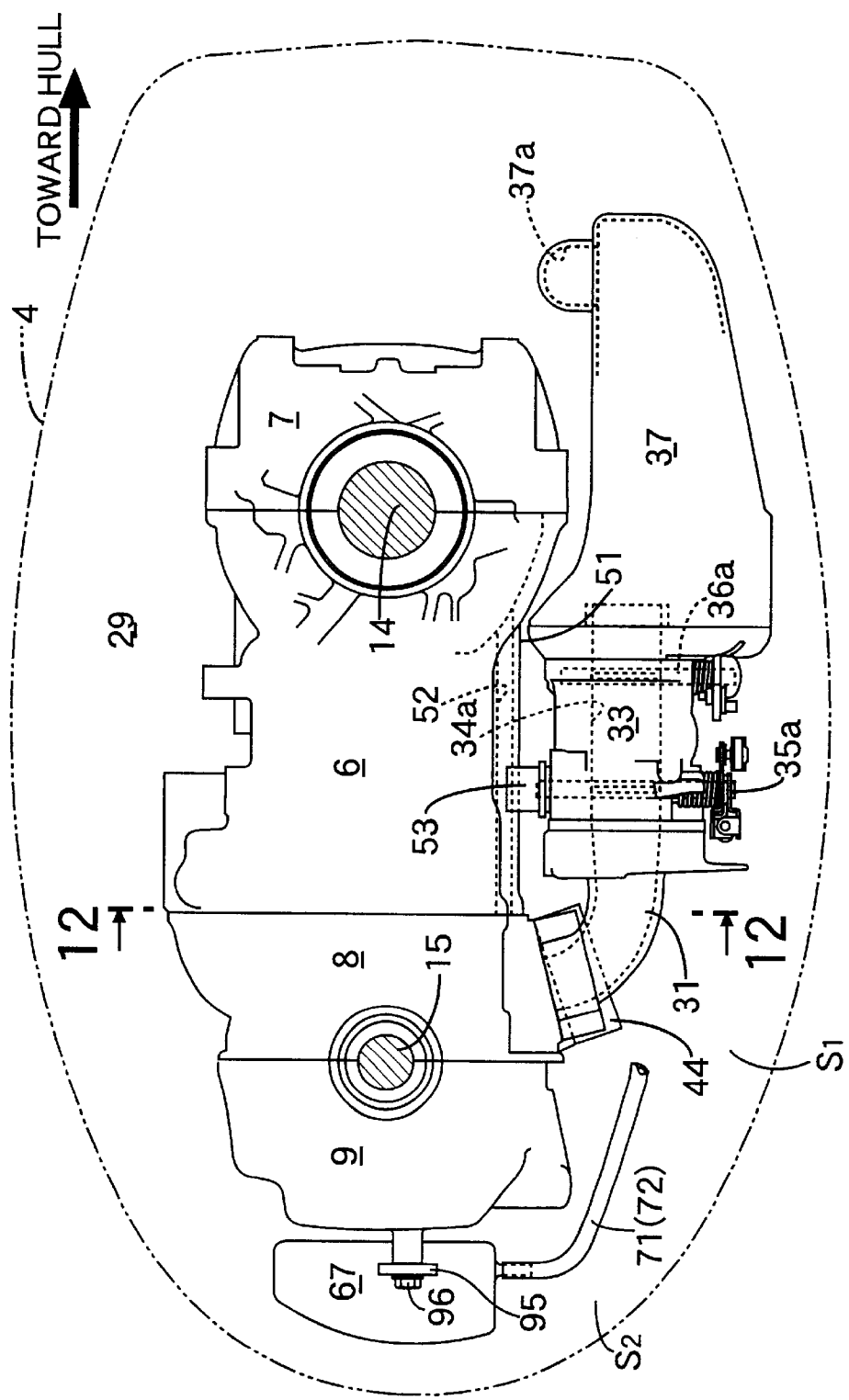
FIG. 4 is a sectional view taken along a line 4—4 in FIG. 2.
Figure 6:
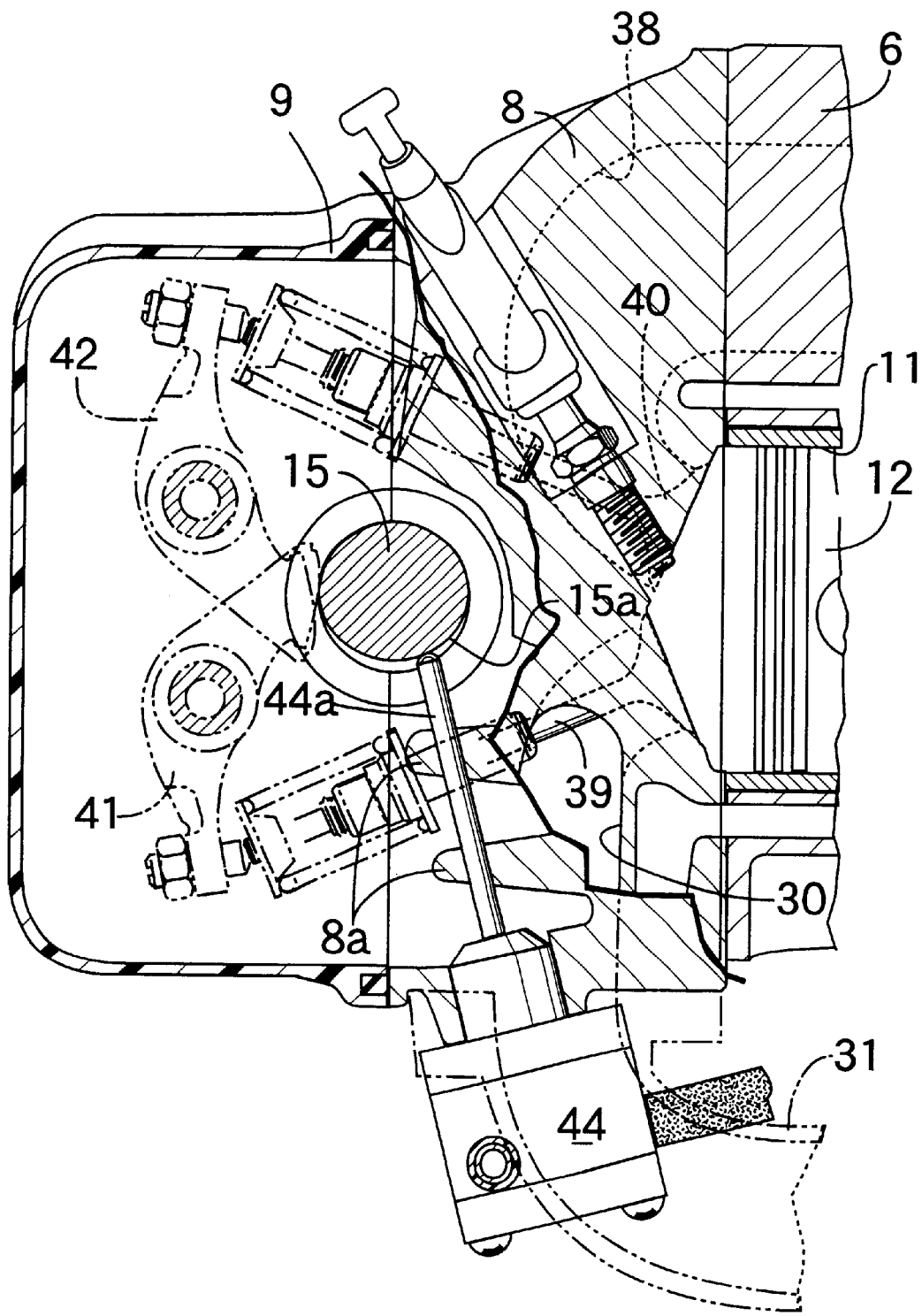
FIG. 6 is a sectional view taken along a line 6—6 in FIG. 3.

As shown in FIGS. 3, 4 and 6, three intake ports 30 corresponding to the three cylinders 11 are opened in one side of the cylinder head 8, and three intake pipes 31 are secured to the one side of the cylinder head 8 to communicate with the intake ports 30 individually. Three carburetors 33 are connected individually to upstream ends of the intake pipes 31. The intake pipes 31 are bent forwards (toward the hull) in order to ensure that the carburetors 33 are disposed compactly on one side of the cylinder block 6. Moreover, the intake pipes 31 are inclined with their upstream ends turned upwards, in order to allow a liquid fuel adhered to inner walls of the intake pipes 31 to flow down naturally toward the intake ports 30.

Pivotally supported on a body 34 of each of the carburetors 33 are a butterfly-type throttle valve 35 for opening and closing an intake path 34a in the carburetor body 34, and a choke valve 36 positioned upstream of the throttle valve 35. A common intake chamber 37 is connected to upstream ends of the intake paths 34a in all the carburetors 33. The intake chamber 37 has a front end extending to ahead of the crankcase 7, and an intake bore 37a is provided at one side of the intake chamber 37 to open into the engine room 29. Therefore, air flowing from an air introducing bore 4a in an upper portion of the engine cover 4 into the engine room 29 is introduced through the intake bore 37a into the intake chamber 37, where the air is dispensed into the intake paths 34a in the three carburetors 33. An intake sound generated in each of the intake paths 34a is attenuated in the intake chamber 37.

Referring to FIG. 6, an intake valve 39 and an exhaust valve 40 for opening and closing the intake port 30 and the exhaust port 38 corresponding to each of the cylinders 11 respectively are mounted in the cylinders 8, and opened and closed by the cam shafts 15 through an intake rocker arm 41 and an exhaust rocker arm 42. A pump driving cam 15a is provided on the camshaft 15. A reciprocating fuel pump 44 is mounted on one side of the cylinder head 8 adjacent the intake port 30, and has a push rod 44a which is slidably carried on a support wall 8a within the cylinder head 8 and engaged at its tip end with the pump driving cam 15a.

As shown in FIG. 3, the fuel pump 44 includes a single inlet pipe 44i and two outlet pipes 44o. A fuel inlet tube 45i connected to a fuel tank (not shown) within the hull is connected to the inlet pipe 44i, and a fuel outlet tube 45o connected to float chambers in two upper carburetors 33 is connected to one of the outlet pipes 44o, while a fuel outlet tube 45o connected to a float chamber in the lowermost carburetor 33 is connected to the other outlet pipe 45o. Therefore, during rotation of the camshaft 15, the pump driving cam 15a drives the fuel pump 44 and hence, the pump 44 can pump fuel out of the fuel tank (not shown) to supply the fuel into the float chamber in each of the carburetors 33.

The three carburetors 33 are disposed vertically with the intake paths 34a disposed horizontally along the side of the cylinder block 6. The throttle valve 35 of each carburetor 33 has a valve stem 35a disposed to extend horizontally through the intake path 34a, and a throttle-operating lever 47 is secured to an outer end of the valve stem 35a. The three throttle operating levers 47 are connected to one another through an interlocking link 48. The choke valve 36 of each carburetor 33 has a valve stem 36a which is also disposed to extend horizontally through the intake path 34a, and a choke operating lever 49 is secured to an outer end of the valve stem 36a. The three choke operating levers 49 are connected to one another through an interlocking link 50. In this manner, a multi-carburetor structure C is formed by the three carburetors 33.

Figure 12:
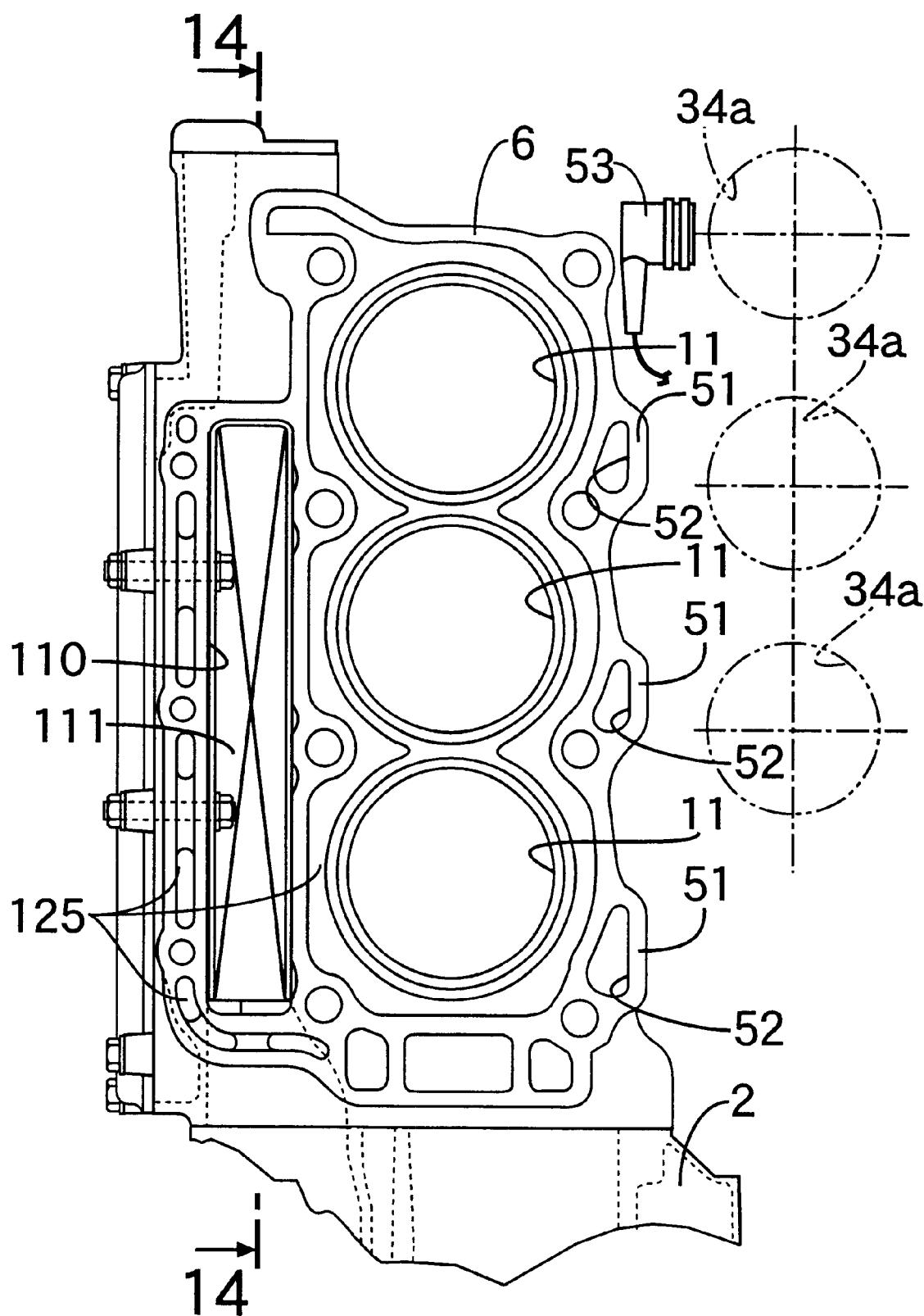
FIG. 12 is a view of an upper half in section taken along a line 12—12 in FIG. 4.

Referring to FIGS. 3, 4 and 12, three ribs 51 are formed in a vertical arrangement on a side of the cylinder block 6 of the engine E adjacent the carburetors 33 to extend axially of the cylinder 11, so that they are passed through the intermediate and lowermost carburetors 33. A breather passage 52 is defined in each of the ribs 51 permit the communication between the crank chamber in the crankcase 7 and a valve-operating chamber in the cylinder head 8. To form the outboard engine system O compactly, the three carburetors 33 are disposed in proximity to the side of the cylinder block 6, but in this case, a dead space is created above the uppermost rib 51. A throttle sensor 53 is mounted at an inner end of the valve stem 35a of the throttle valve 35 of the uppermost carburetor 33 by utilizing the dead space. Therefore, the throttle sensor 53 can be attached to the valve stem 35a from above the engine E and detached from the valve stem 35a without being obstructed in any way by the rib 51. This leads to a good maintenance, and also the throttle sensor 53 is surrounded and protected by the cylinder block 6 and the carburetor 33, and can be prevented from being damaged due to the contact with other parts. The throttle sensor 53 detects an opening degree of the throttle valve 35 as an amount of air drawn in the engine E, in other words, as a load. The single throttle sensor 53 suffices, because the throttle valves 35 of the three carburetors 33 are operatively associated with one another, as described above.

A follower arm 55 having a roller 55a pivotally supported at its tip end is connected to any one of the three throttle operating levers 47 (the lowermost throttle operating lever in the illustrated embodiment), while a driving arm 56 is pivotally supported on a bracket (not shown) mounted on the lowermost carburetor 33. The roller 55a of the follower arm 55 is provided to engage a cam groove 56a provided in the driving arm 56. A throttle drum 57 is fixedly mounted on a boss of the driving arm 56, and an operating wire 58 connected to a control lever (not shown) mounted in a cabin in the hull is connected to the throttle drum 57.

When the operating wire 58 is operated in an accelerating direction to turn the throttle drum 57 in the direction indicated by an arrow A in FIG. 3, the roller 55a is moved following the cam groove 56a in the driving arm 56 rotated along with the throttle drum 57. Thus, the follower arm 55 can turn all of the throttle operating levers 47 in a direction to open the throttle valve 35. When the operating wire 58 is operated in a decelerating direction to turn the throttle drum 57 in the direction opposite from the arrow A, all of the throttle operating levers 47 can be of course turned in a direction to close the throttle valve 35.

Figure 7:
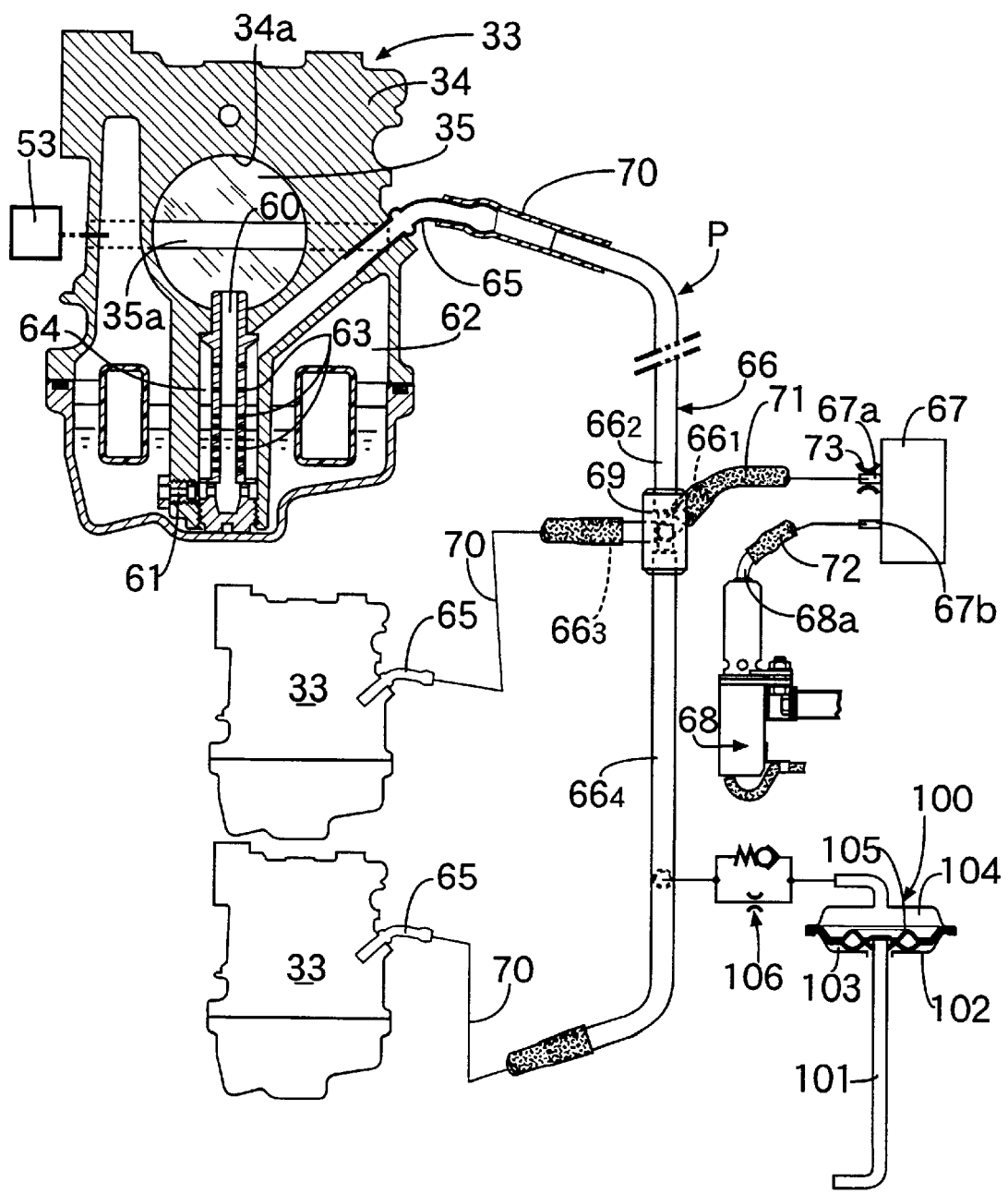
FIG. 7 is an illustration of the entire arrangement of a control system for carburetors in FIG. 3.

Referring to FIG. 7, each of the carburetors 33 includes a main nozzle 60, which opens into a Venturi portion of the intake path 34a. The main nozzle 60 communicates with an area under the liquid level of the fuel in a float chamber 62 through a main jet 61. A large number of air-bleeding bores 63 are made in a peripheral wall of the main nozzle 60, and a cylindrical air-bleeding chamber 64 is provided in communication with the air-bleeding bores 63 to surround the main nozzle 60. A tube joint 65 is projectingly provided on an outer side of the carburetor 33 to communicate with an upper portion of the air-bleeding chamber 64.

A single common duty control valve 68 is connected to the tube joints 65 of the three carburetors 33 through a dispensing tube 66 and a surge tank 67.

Figure 9:
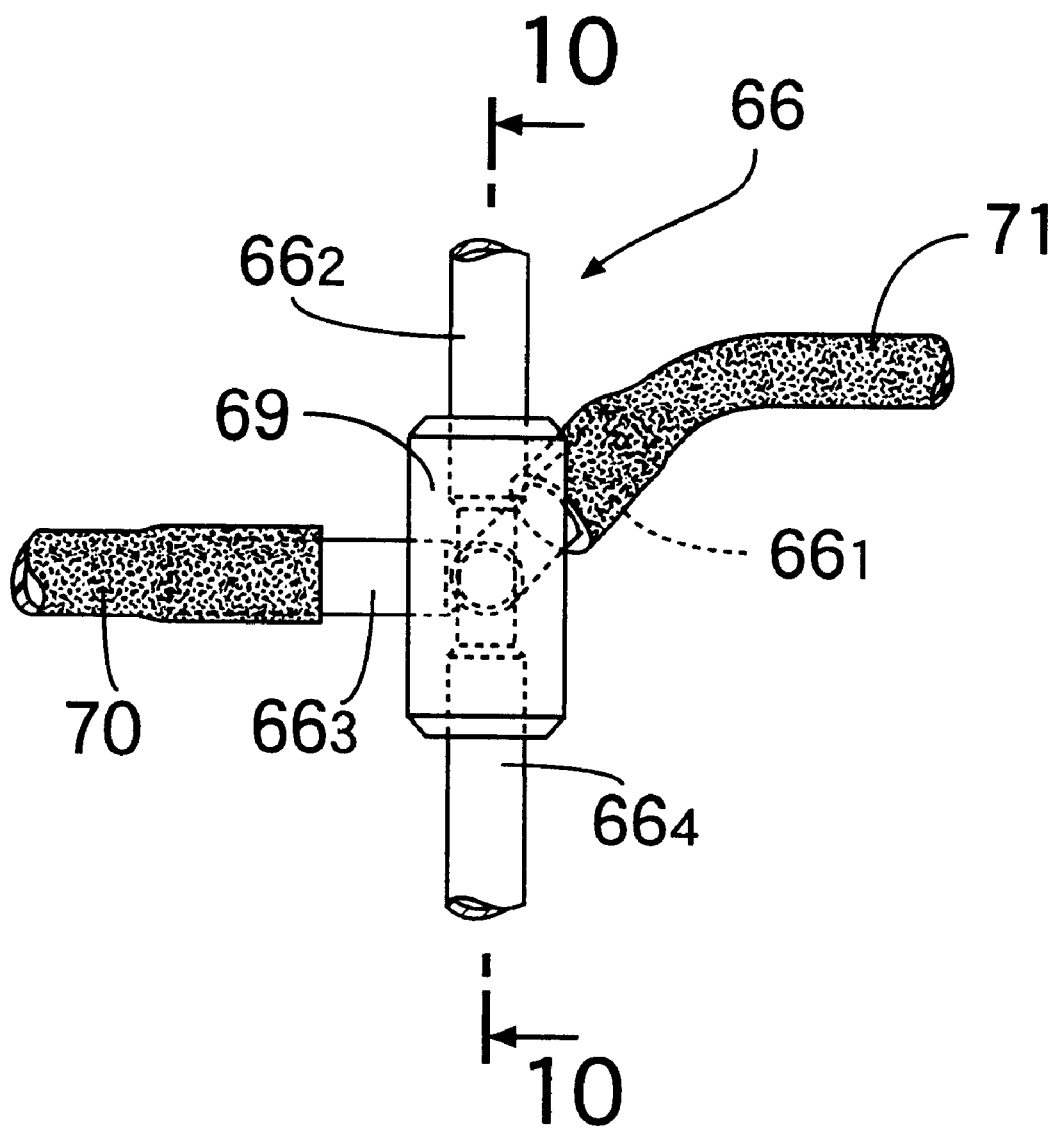
FIG. 9 is an enlarged view of a portion indicated by 9 in FIG. 7.
Figure 10:
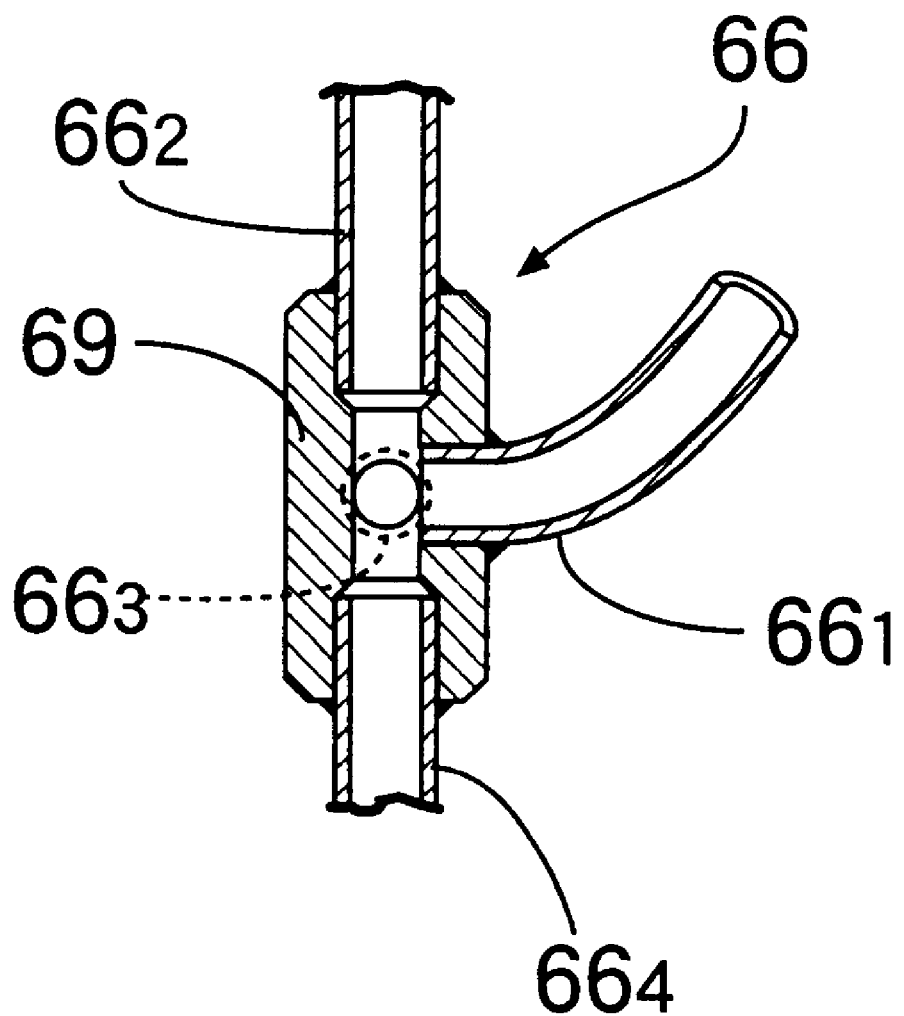
FIG. 10 is a sectional view taken along a line 10—10 in FIG. 9.

As shown in FIGS. 7, 9 and 10, the dispensing tube 66 is made of a metal or a hard synthetic resin and comprised of a single inlet tube $66_1$ integrally connected with three outlet tubes $66_2$, $66_3$ and $66_4$ through a connecting member 69. In this case, the single inlet tube $66_1$ and the three outlet tubes $66_2$, $66_3$ and $66_4$ are disposed, so that all of angles formed by the outlet tubes $66_2$, $66_3$ and $66_4$ with respect to the inlet tube $66_1$ at their connections are substantially equal to one another. In the illustrated embodiment, such angles are substantially 90°.

The three outlet tubes $66_2$, $66_3$ and $66_4$ may be gently curved toward the corresponding carburetors 33, as required, and connected to the tube joints 65 of the three carburetors 33 through flexible tubes 70, respectively.

Figure 11:
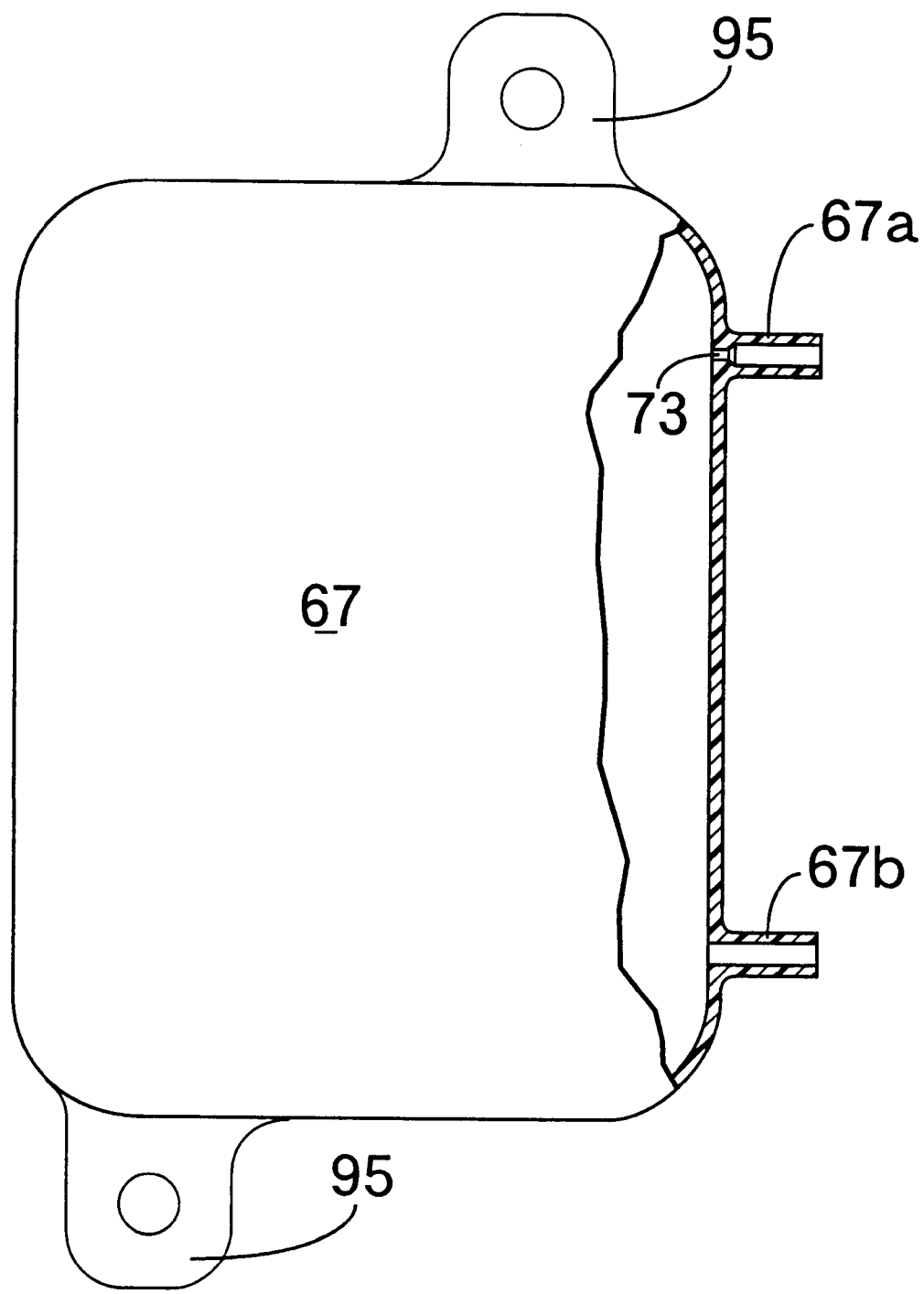
FIG. 11 is a partially vertical sectional plan view of a surge tank in FIG. 7.

On the other hand, the surge tank 67 is made of a synthetic resin and includes a pair of tube joints 67a and 67b isolated from each other, as shown in FIG. 11. One of the tube joints 67a is connected to the inlet tube $65_1$ through a flexible joint 71, and the other tube joint 67b is connected to a tube joint 68a of the duty control valve 68 through a flexible tube 72. An orifice 73 is defined in that tube joint 67a of the surge tank 67, which is connected to the inlet tube $65_1$.

The dispensing tube 66 and the flexible tubes 70, 71 and 72 form a secondary air passage P for supplying secondary air for regulating a air-fuel mixture A/F to the air-bleeding chamber 64, and thus the surge tank 67 and the orifice 73 are incorporated in series in the secondary air passage P.

Figure 8:
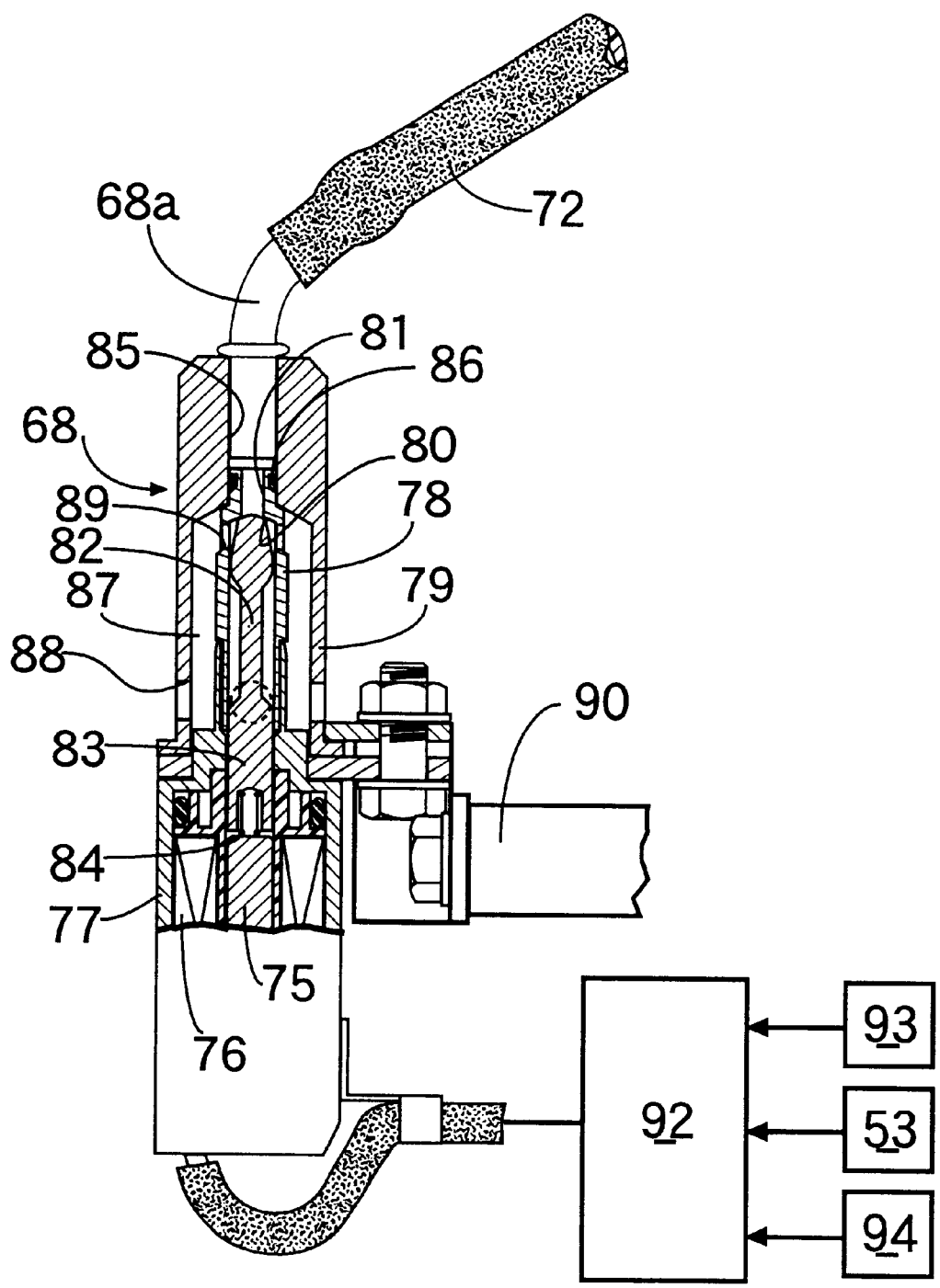
FIG. 8 is a vertically sectional side view of a duty control valve in FIG. 7.

As shown in FIG. 8, the duty control valve 68 includes a stationary core 75, a coil 76 surrounding the stationary core 75, and a coil housing 77 in which the stationary core 75 and the coil 76 are accommodated. A valve case 78 and an outer case 79 covering the valve case 78 are secured to one end of the coil housing 77. A valve seat 80 and an air outlet 81 connected to the valve seat 80 are formed at one end of the valve case 78. A valve member 82 cooperating with the valve seat 80 is accommodated within the valve case 78, and a movable core 83 integrally formed on the valve member 82 is opposed to the stationary core 75. A valve spring 84 is mounted under compression between both the cores 75 and 83 for biasing the valve member 82 in a closing direction, i.e., in a direction to seat the valve member 82 on the valve seat 80.

The outer case 79 is provided at an end opposite from the coil 76 with a joint mounting bore 85 into which the tube joint 68a is press-fitted, and one end of the valve case 78 is fitted air-tightly into an inner end of the tube mounting bore 85 with a seal member 86 interposed therebetween. A cylindrical air chamber 87 is defined between the valve case 78 and the outer case 79, excluding such fitted portion of the valve case 78. The outer case 79 is provided with an air inlet 88 for opening the air chamber 87 into the atmosphere on the side of the coil 76, and the valve case 78 is provided with a through-bore 89 which permits the air chamber 87 into communication with the inside of the valve seat 80 on the side opposite from the air inlet 88.

The duty control valve 68 formed in the above manner is supported on a bracket 90 secured in place in the engine E at an attitude with the tube joint 68a being above the coil 76, i.e., at an attitude with the air inlet 88 located below the air outlet 81. Such attitude of the duty control valve 68 ensures that if splashes of seawater or the like entering the engine room 29 should enter the air inlet 88 powerfully, the vigor of the splashes is attenuated immediately in the cylindrical air chamber 87 and hence, the splashes do not reach the through-bore 89 located on the upper side and flow to the outside through the air outlet 81. Thus, it is possible to avoid the entering of the splashes into the valve case 78.

When the coil 76 is excited in the duty control valve 68 during operation of the engine E, the movable core 83 is attracted to the stationary core 75 against a load of the valve spring 84, whereby the valve member 82 is moved away from the valve seat 80 to open the air outlet 81. As a result, the air entering the air chamber 87 through the air inlet 88 is passed through the through-bore 89 and the air outlet 81 and dispensed into the air-bleeding chambers 64 in the three carburetors 33 via the surge tank 67 by the dispensing tube 66.

In the intake path 34a in each of the carburetors 33, an amount of intake air corresponding to the opening degree of the throttle valve 35 flows toward the intake port 30 in the engine E, and a negative pressure generated at an upper end of the main nozzle 60 with such flowing of the air causes the fuel metered by the main jet 61 to be ejected through the main nozzle 60 and drawn into the corresponding cylinder 11, while producing an air-fuel mixture together with the intake air flowing through the intake path 34a.

At this time, the air dispensed into each of the air-bleeding chambers 64 is passed through the large number of air-bleeding bores 63 in the main nozzle 60 and mixed with the fuel flowing upwards within the main nozzle 60 and hence, the atomization of the fuel can be promoted. If the amount of fuel mixed, i.e., the amount of air bled, is increased, the A/F ratio of the air-fuel mixture produced in the intake path 34a can be decreased. On the other hand, if the amount of fuel mixed, i.e., the amount of air bled, is decreased, the A/F ratio of the air-fuel mixture can be increased.

In order to control such amount of air bled, a duty control unit 92 is connected to the coil 76 of the duty control valve 68. Connected to an input portion of the duty control unit 92 are an engine rotational speed sensor 93 for detecting a rotational speed of the engine E, the throttle sensor 53, and an output portion of an LAF sensor 94 (see FIG. 13) for detecting the A/F ratio of an exhaust gas to output a detection signal proportional to the A/F ratio.

Therefore, the duty control unit 92 is capable of determining a magnitude of an engine load based on detection signals from the engine rotational speed sensor 93 and the throttle sensor 53, determining the A/F ratio of the exhaust gas based on a detection signal from the LAF sensor 94, determining a duty ratio of a pulse applied to the coil 76 based on the magnitude of the engine load and the A/F ratio of the exhaust gas, and controlling the total time of opening operation of the valve member 82 to regulate the amount of air bled into each of the carburetors 33. Thus, it is possible to regulate the A/F ratio of the air-fuel mixture to a desired value corresponding to the engine load and the A/F ratio of the exhaust gas, while improving the atomization of the fuel in the air-fuel mixture supplied from each of the carburetors 33 into the corresponding cylinder 11, thereby enhancing the output performance of the engine E and the properties of the exhaust gas.

Moreover, the amount of air bled into the plurality of carburetors 33 can be controlled by the single common duty control valve 68 and hence, the arrangement can be simplified to contribute to a reduction in cost, and the placement of the engine in the narrow engine room 29 in the outboard engine system O can be carried out easily without being interfered with an other part.

In dispensing the air metered by the single common duty control valve 68 into the three carburetors 33 by the dispensing tube 66, when the air exiting from the inlet tube $66_1$ is diverted into the three outlet tubes $66_2$, $66_3$ and $66_4$, the courses are obliged to be bent at substantially the same angle, because the single inlet tube $66_1$ and the three outlet tubes constituting the dispensing tube 66 are disposed, so that all of the angles formed by the outlet tubes $66_2$, $66_3$ and $66_4$ with respect to the inlet tube $66_1$ at the fitted portions thereof are substantially equal to one another, as described above. Thus, the resistances in the flow paths can be equalized, thereby equally dispensing the air into the outlet tubes $66_2$, $66_3$ and $66_4$. Moreover, since each of the outlet tubes $66_2$, $66_3$ and $66_4$ is bent gently toward the corresponding carburetor 33, as required, it is possible to prevent a difference from being produced between the resistances in the flow paths extending from the three outlet tubes $66_2$, $66_3$ and $66_4$ to the corresponding carburetors 33, to the utmost. In this way, the amount of air bled into the three carburetors 33 can be controlled equally.

A pressure pulsation is produced in the flow path extending from the duty control valve 68 to the air-bleeding chamber 64 with the turning-on and off of the application of the pulse to the coil 76. However, because the surge tank 67 and the orifice 73 are incorporated in series in the common flow path connecting the dispensing tube 66 and the duty control valve 68 to each other, the pressure pulsation can be attenuated effectively by the damping effect of the surge tank 67 and a constricting resistance of the orifice 73. Therefore, it is possible to prevent the generation of a vibration and a noise due to such pressure pulsation, and it is also possible to provide the compactness of the surge tank 67 by use of the orifice 73 in combination with the surge tank 67.

Referring to FIG. 4, the fuel pump 44 is mounted to one side of the cylinder head 8, so that it is located in the rear of the carburetors 33 disposed on one side of the cylinder block 6, and a mounting piece 95 for the surge tank 67 is secured to a rear surface of the head cover 9 by a bolt 96, so that the surge tank 67 is located at the rearmost portion of the engine E. With such arrangement, a first space $S_1$ defined at the rear of the carburetor 33 by one side of the cylinder head 8 and an inner surface of the engine cover 4 is utilized effectively for placement of the fuel pump 44, and a second space $S_2$ defined by a rear surface of the head cover 9 and the inner surface of the engine cover 4 is utilized effectively for placement of the surge tank 67. This can contributes to the compactness of the outboard engine system O.

Referring again to FIGS. 3 and 7, an accelerating pump 100 is connected to the driving arm 56 through a pushrod 101 and is operated when the driving arm 55 is turned in an accelerating direction, i.e., in the direction indicated by an arrow R. The accelerating pump 100 includes a diaphragm housing 102 secured in place to the engine E, and a diaphragm 105 which divides the interior of the diaphragm housing 102 into an atmospheric chamber 103 and an operating chamber 104. The driving arm 56 is connected to the diaphragm 105 through the pushrod 101, and the operating chamber 104 is connected in place to the dispensing tube 66 through a one-way throttle valve 106. The one-way throttle valve 106 is designed so that when the air flows from the operating chamber 104 toward the dispensing tube 66, the one-way throttle valve 106 is opened and provides a throttling resistance to the flow of the air in an opposite direction.

Thus, when the driving arm 56 is turned in the accelerating direction A, the pushrod 101 operates the diaphragm 105 so as to pressurize the operating chamber 104. When the operating chamber 104 is pressurized, the air within the operating chamber 104 is pumped through the dispensing tube 66 into the air-bleeding chamber 64 in each of the carburetors 33, while opening the one-way throttle valve 106. Therefore, such air urges the liquid level of the fuel within the air-bleeding chamber 64 to force the fuel into the main nozzle 60 through the large number of air-bleeding bores 63, thereby promoting the ejection of the fuel from the nozzle 60. Therefore, in an accelerating operation for rapidly opening the throttle valve 35, the retarding of the increasing of the amount of fuel ejected can be eliminated despite a sudden increase in amount of air drawn, thereby providing a good accelerating property to the engine E.

On the other hand, in a decelerating operation for rapidly closing the throttle valve 35, to the contrary, the pushrod 101 operates the diaphragm 105 so as to depressurize the operating chamber 104. Therefore, a negative pressure generated in the operating chamber 104 is transmitted to the air-bleeding chamber 64 in each of the carburetors 33, while being limited in transmission speed by the one-way throttle valve 106. Thus, the ejection of the fuel from the main nozzle 60 can be suppressed moderately to contribute to a reduction in amount of fuel consumed.

In this way, the dispensing tube 66 is used for both of an air passage for controlling the amount of air bled to each of the carburetors 33 and an air passage for controlling the acceleration and deceleration of each of the carburetors 33. Thus, it is possible to simplify a piping to a large extent.

Referring to FIGS. 12 to 16, the exhaust port 38 defined in the cylinder head 8 in correspondence to each of the cylinders 11 and a vertically long exhaust-collecting chamber 110 defined in a side of the cylinder block 6 opposite from the carburetors 33 are in communication with each other at a joint between the cylinder block 6 and the cylinder head 8. A first three-dimensional catalytic converter 111 is mounted in the exhaust-collecting chamber 110.

A continuous exhaust line 114 is integrally formed on one side of the mount case 2 to which the lower surface of the cylinder block 6 is bonded, and on one side of an oil tank 113 bonded to the lower surface of the mount case 2. The exhaust line 114 is connected to a lower portion of the exhaust-collecting chamber 110. A connecting flange connected to an upper portion of an exhaust box 115 is secured to a lower end of the exhaust line 114 by a bolt 117, and a support piece 118 welded to an outer side of a lower portion of the exhaust box 115 is secured to a bottom of an oil tank 113 by a bolt 119. The oil tank 113 stores a lubricating oil for the engine E.

The exhaust box 115 includes a large-diameter inlet case 120 coupled to a ceiling plate 115a of the exhaust box 115 to permit the exhaust line 114 to communicate with the exhaust collecting chamber 110, and a small-diameter outlet case 121 which is coupled to a bottom plate 11b in line with the inlet case 120, and which opens at its upper end into an upper portion of the exhaust box 115 and at its lower end into the extension case 1. A second three-dimensional catalytic converter 112 is mounted in the inlet case 120.

Thus, exhaust gases discharged from the cylinders 11 into the exhaust ports 38 meet one another in the exhaust collecting chamber 110, and the resulting exhaust gas flows via the exhaust line 114 toward the exhaust box 115; passes sequentially through the inlet case 120 and the outlet case 121; and is discharged into the extension case 1. Then, the exhaust gas is discharged into external water through the inside of the propeller 20 along with cooling water which has cooled the engine E.

The first three-dimensional catalytic converter 111 is mounted in the exhaust collecting chamber 110, and the second three-dimensional catalytic converter 112 is mounted in the inlet case 120 of the exhaust box 115, as described above. Therefore, The exhaust gas passed through these converters 111 and 112 can be purified effectively in a wide operating range of the engine E extending from a cool state to a warmed-up state. In other words, HC, $CO_2$ and $NO_x$ can be removed from the exhaust gas. Particularly, the A/F ratio of the air-fuel mixture in the carburetor 33 to be supplied to the engine E can be controlled in a wide operating range of the engine E extending from a low load to a high load by regulating the duty ratio of the pulse applied to the duty control valve 68 by the duty control unit 92, based on the detection signal from the LAF sensor 94 as described above, thereby improving the properties of the exhaust gas and enhancing the engine output.

Figure 17:
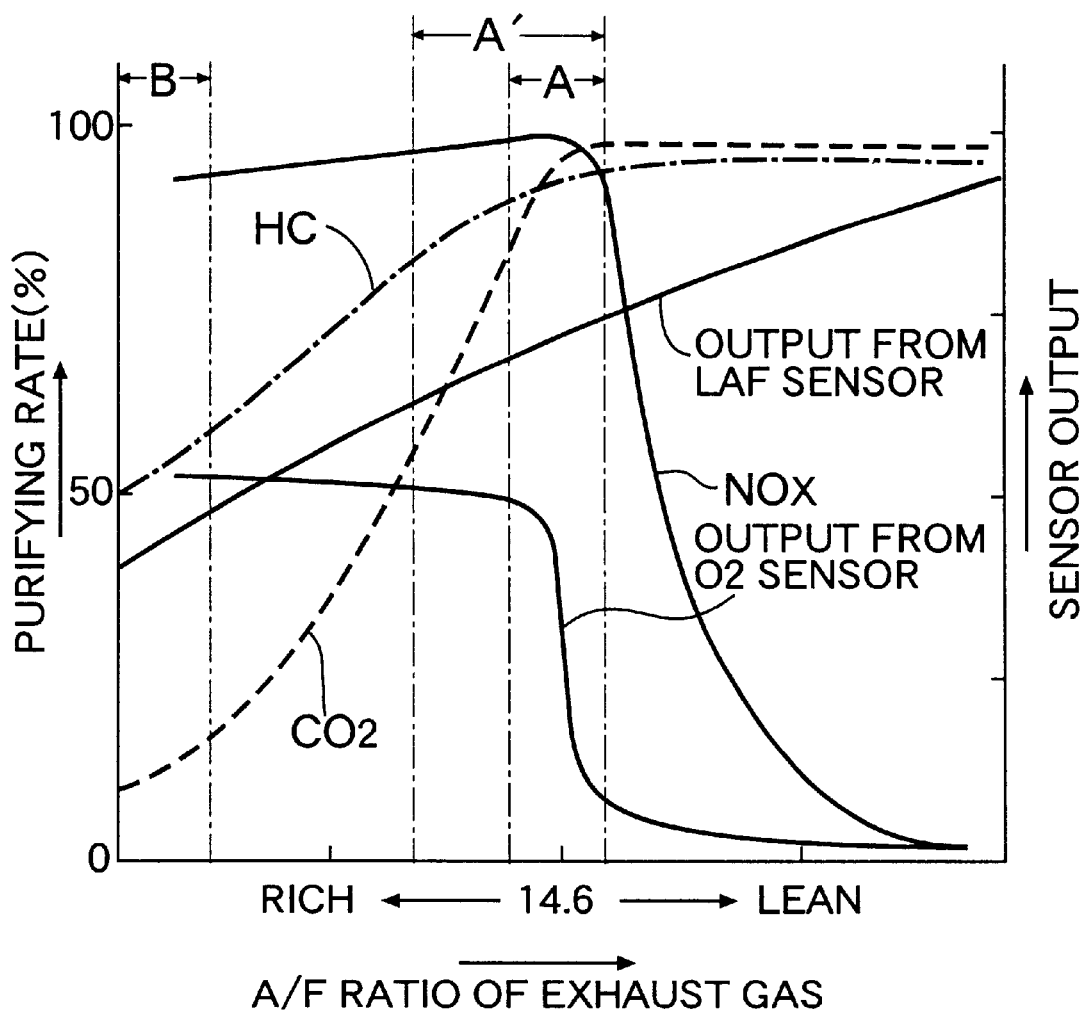
FIG. 17 is a diagram showing the relationship between the purifying rate of three-dimensional catalytic converters and the A/F ratio of an exhaust gas and the relationship between outputs from an $O_2$ sensor and an LAF sensor and the A/F ratio of the exhaust gas.

Namely, the output from the LAF sensor 94 is proportional to the A/F ratio of the exhaust gas, as shown in FIG. 17, and hence, the A/F ratio of the exhaust gas can be controlled to a narrow range A including a theoretic A/F ratio, and moreover, in any of a case A' when the tolerance of the purifying rate of the catalytic converters 111 and 112 has been set relatively widely with the engine output taken into consideration to a certain extent, and a case B when the set range is shifted to a rich side with the engine output taken into serious consideration, the A/F ratio of the exhaust gas can be controlled properly to a desired target value. Therefore, it is possible to carry out the control operation depending on the operating conditions of the engine such as a mode with the purification taken into serious consideration, a mode with the purification and output taken in consideration and a mode with the output taken into serious consideration. An increase in engine output enables the size of the engine to be reduced and hence, it is easy to place the engine in the narrow engine room in the outboard engine system.

The exhaust collecting chamber 110 is opened by separating the cylinder head 8 from the cylinder block 6 and hence, the attachment and detachment of the first catalytic converter 111 can be carried out easily by such opening.

On the other hand, in the exhaust box 115, an upper end of the outlet case 121 is disposed above a lower end of the inlet case 120. Therefore, even if the water level within the extension case 1 is raised, the entrance of water into the inlet case 120 and thus into the second catalytic converter 112 can be avoided, unless the outlet case 121 is submerged under water.

In the above-described dispositions of the inlet case 120 and the outlet case 121, however, water drops produced with the purifying action provided for the exhaust gas by the first and second catalytic converters 111 and 112 are accumulated in the bottom of the exhaust box 115. To discharge the accumulated water, a drainage pipe 122 is mounted to the exhaust box 115. The drainage pipe 122 is formed by bending a pipe having a diameter far smaller than that of the outlet case 121 into an inverted U-shape, and has one lower end 122a which is disposed to open in proximity to an upper surface of the bottom plate 11b of the exhaust box 115, and the other lower end 122b which is disposed to open below the bottom plate 11b outside the exhaust box 115.

During operation of the engine E, an exhaust pressure is always applied to the inside of the exhaust box 115 and hence, a difference in pressure is produced between the inside of the exhaust box 115 and the inside of the extension case 1. Therefore, when the water has been accumulated on the bottom plate 11b of the exhaust box 115 with the purification of the exhaust gas provided by the first and second catalytic converters 111 and 112, the water is discharged through the drainage pipe 122 into the extension case 1 by the pressure difference. Thus, the water can be prevented from entering the second catalytic converter 112. In addition, the bent portion of the drainage pipe 122 is located above the opposite lower ends of the drainage pipe 122 and hence, even if the water level within the extension case 1 is raised, the water can be also prevented from being entering the exhaust box 115 from the drainage pipe 122, unless the bent portion of the drainage pipe 122 is submerged under the water.

Figure 13:
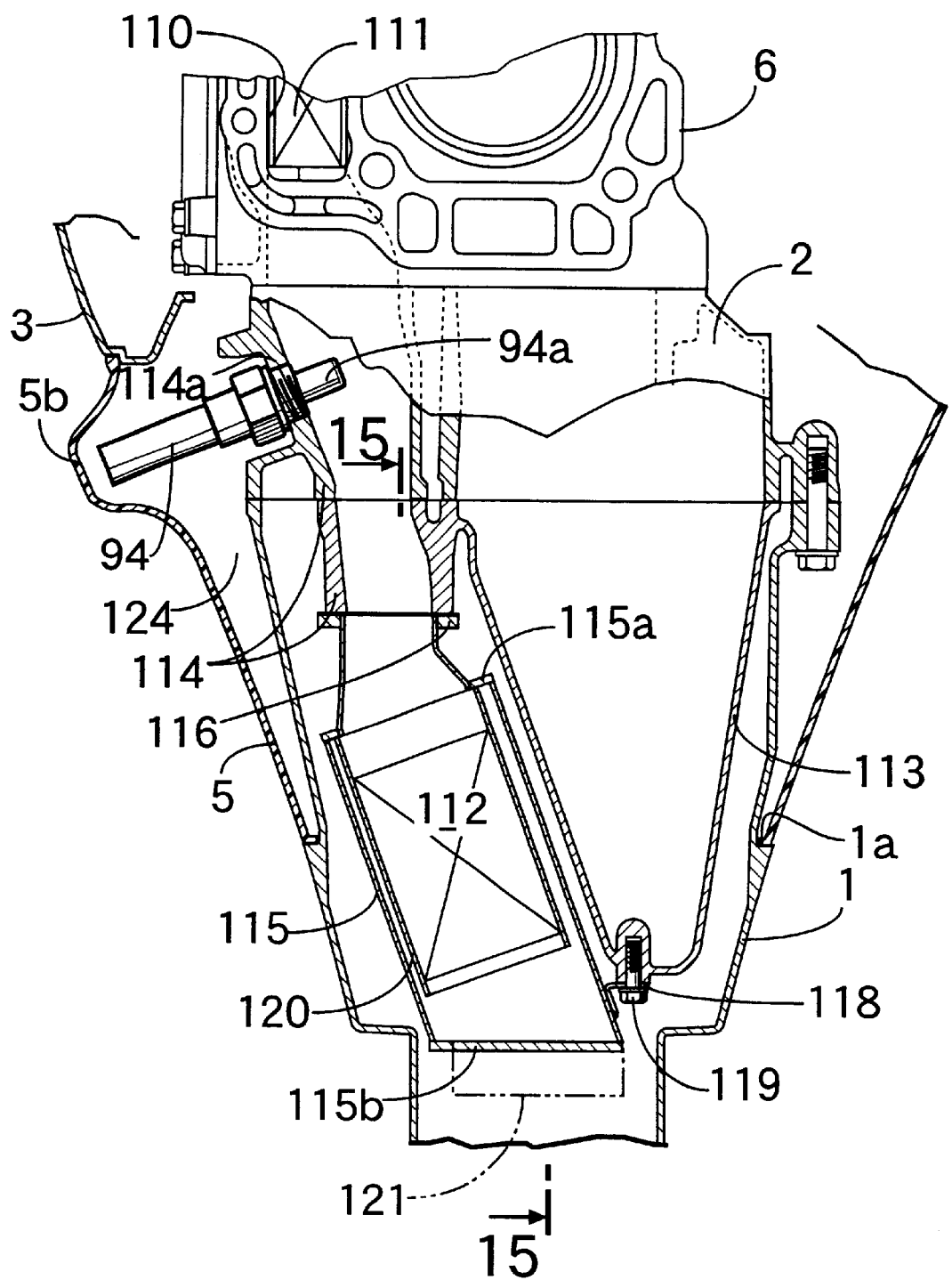
FIG. 13 is a view of a lower half in section taken along the line 13—13 in FIG. 4.

As shown in FIG. 13, the LAF sensor 94 is mounted to the exhaust line 114 integrally formed on the mount case 2 in the following manner: A mounting wall 114a is formed on a side of the exhaust line 114 facing outwards of the outboard engine system O, so that it is inclined inwards of the exhaust line 114 toward its lower portion. The LAF sensor 94 is screwed to the mounting wall 114a at a substantially vertical attitude, and provided at its tip end with a detecting portion 94a protruding to a center portion within the exhaust line 114.

The LAF sensor 94 is disposed in an annular space 124 defined by the mount case 2 and the under cover 5 surrounding the mount case 2. If the LAF sensor 94 is as long as it is not accommodated fully in the annular space 124, as in the illustrated embodiment, an outward bulging portion 5b for receiving an outer end of the LAF sensor 94 is formed at a portion of the undercover 5.

Since the mounting wall 114a of the exhaust line 114 is inclined inwards of the exhaust line 114 toward its lower portion, as described above, the length of protrusion of the LAF sensor mounted at the vertical attitude to the mounting wall 114a in an outward direction of the outboard engine system O can be suppressed to a value as small as possible, whereby the contact of the sensor 94 with another portion or component can be avoided to the utmost, and the detection of the A/F ratio of the exhaust gas can be carried out reliably. Moreover, it is possible to easily attach and detach the LAF sensor 94 to and from the mounting wall 114a, because the LAF sensor 94 is directed outwards of the outboard engine system O.

Furthermore, since the LAF sensor 94 is disposed in the annular space 124 inside the undercover 5, the undercover 5 serves as a protective wall for the LAF sensor 94 to prevent the contact of another portion or component with the LAF sensor 94. Additionally, the undercover 5 is capable of being removed in the above-described manner and hence, in a state in which the undercover 5 has been removed, the attachment and detachment of the LAF sensor 94 can be carried out easily.

Figure 14:
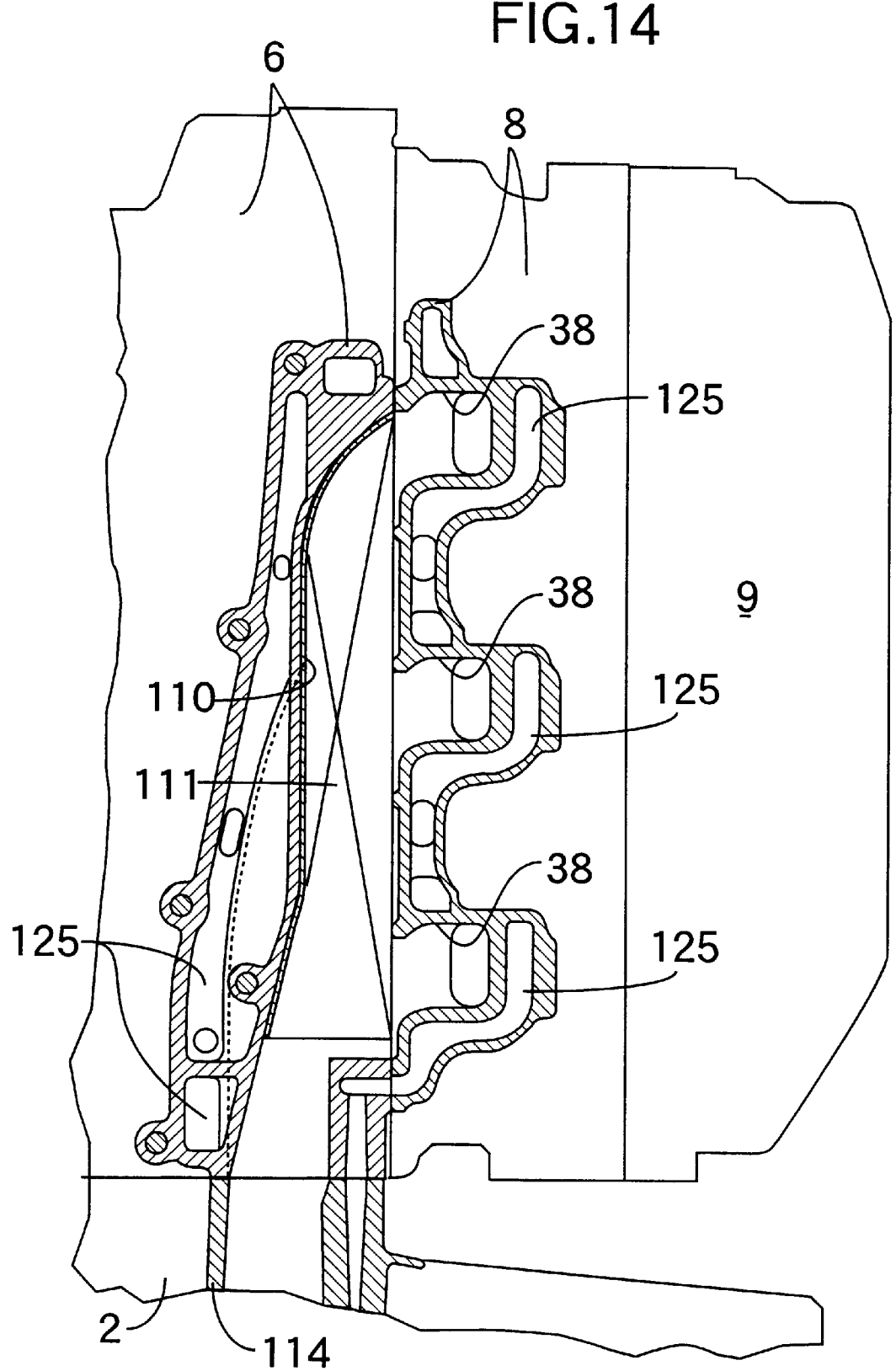
FIG. 14 is a sectional view taken along a line 14—14 in FIG. 12.
Figure 15:
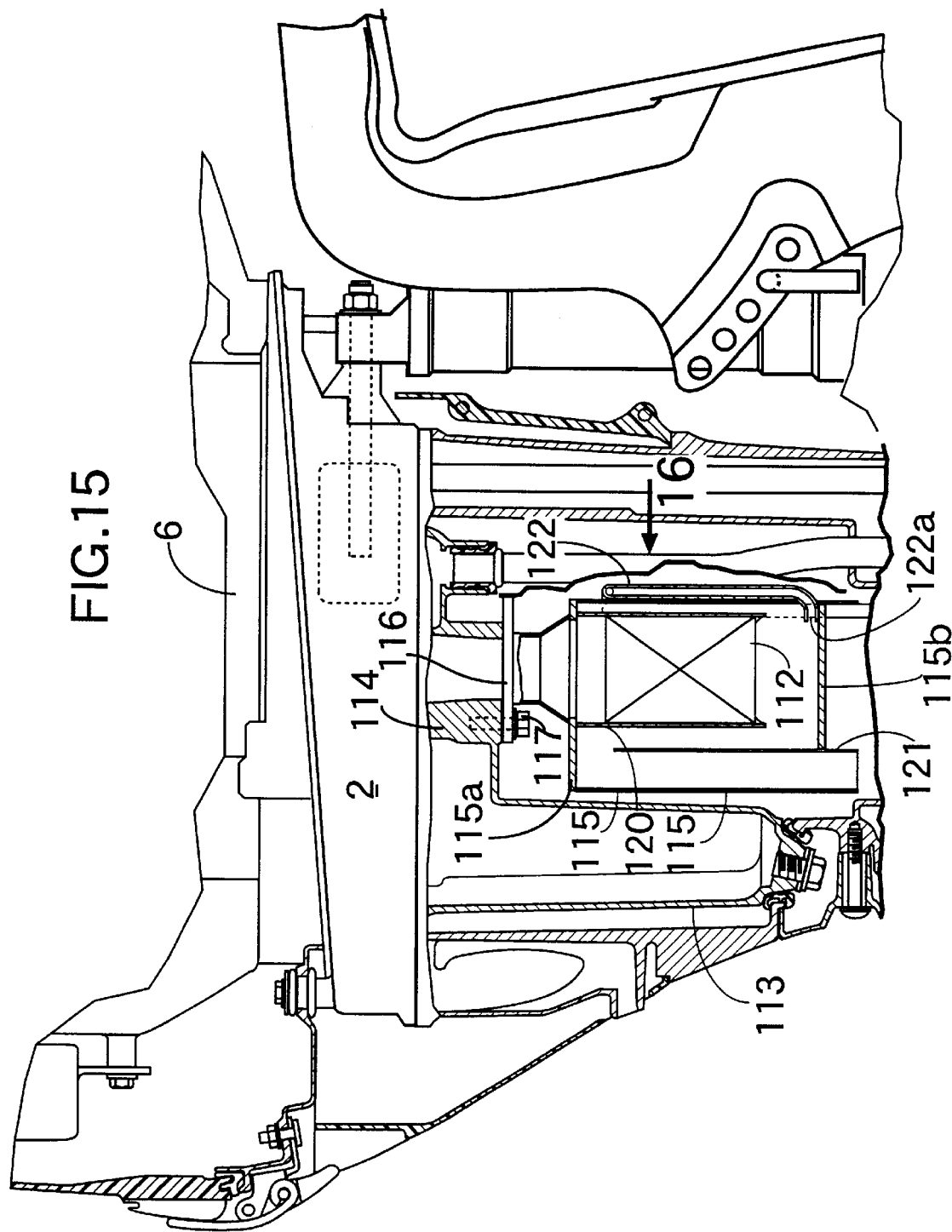
FIG. 15 is a sectional view taken along a line 15—15 in FIG. 13.
Figure 16:
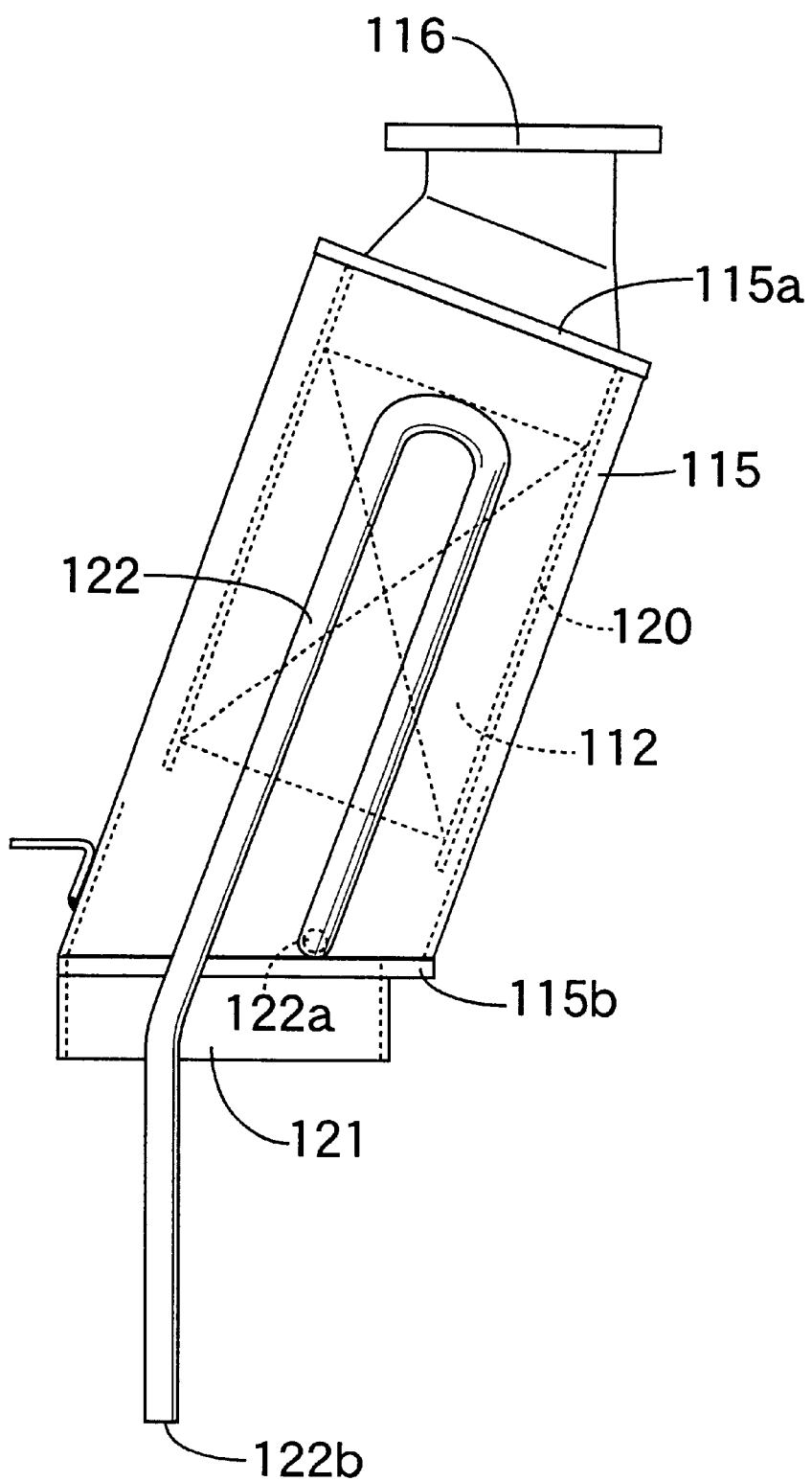
FIG. 16 is a view taken in the direction of an arrow 16 in FIG. 15.

In FIGS. 12 and 14, reference character 125 denotes a cooling water jacket for the engine E.

Although the embodiment of the present invention has been described in detail, it will be understood that the present invention is not limited to the above-described embodiment, and various modifications in design may be made without departing from the spirit and scope of the invention defined in claims. For example, the engine E may be a multi-cylinder engine other than the three-cylinder engine. Any one of the first and second converters 111 and 112 can be omitted.

What is claimed is:

1. An engine intake A/F ratio control system in an outboard engine which includes an engine disposed in an engine room defined by an engine support connected to an upper portion of an extension case by an engine cover covering said engine support, and a catalytic converter incorporated in an exhaust system for the engine, wherein an exhaust gas exiting from said exhaust system is discharged under external water surface via an inside of said extension case, characterized in that said engine intake A/F ratio control system comprises a secondary air passage connected to a carburetor provided in an intake system for the engine for supplying secondary air for regulating the A/F ratio of an air-fuel mixture produced in the carburetor; a duty control unit connected to a duty control valve connected to said secondary air passage for controlling the duty ratio of a pulse applied to a coil of said duty control valve; and an LAF sensor mounted to said exhaust system for detecting an A/F ratio of an exhaust gas flowing through said exhaust system, thereby outputting a detection signal proportional to said A/F ratio to said duty control unit.

2. An engine intake A/F ratio control system in an outboard engine system according to claim 1, wherein a mounting wall is formed in a side wall of an exhaust line integrally connected to said engine to form a portion of said exhaust system, said side wall facing sideways of the outboard engine system, said mounting wall being inclined inwards of the exhaust line toward a lower portion thereof, and said LAF sensor is mounted substantially vertically to said mounting wall.

3. An engine intake A/F ratio control system in an outboard engine system according to claim 1, wherein said exhaust line and said mounting wall are formed on said engine support covered with a detachable undercover, and said LAF sensor mounted to said mounting wall is covered with said undercover.

4. An engine intake A/F ratio control system in an outboard engine system according to claim 1, wherein said exhaust system is provided with an exhaust box, an inlet case which is connected to the exhaust system at a location upstream of said exhaust box and opens at a lower end thereof into said exhaust box, and an outlet case which opens at an upper end thereof into said exhaust box above a lower end of said inlet case and also opens at a lower end thereof below said exhaust box; said catalytic converter is mounted in said inlet case; and a drainage pipe bent into an inverted U-shape is mounted to said exhaust box, with one of lower ends of said drainage pipe opening in the proximity to an internal bottom surface of said exhaust box and other lower end opening below said exhaust box.

5. An engine intake A/F ratio control system in an outboard engine system according to claim 4, wherein a central bent portion of said drainage pipe is disposed at substantially the same level as of an upper end of said outlet case.

* * * * *